US012581581B2

(12) United States Patent
Pantea et al.

(10) Patent No.: US 12,581,581 B2
(45) Date of Patent: Mar. 17, 2026

(54) AEROSOL-GENERATING DEVICE

(71) Applicant: Philip Morris Products S.A., Neuchatel (CH)

(72) Inventors: Silviu Pantea, Arad (RO); Enrico Stura, Palezieux-Village (CH); Mathias Torsten Rickard Tingström, Morges (CH); Valerio Oliana, Pully (CH)

(73) Assignee: Philip Morris Products S.A., Neuchatel (CH)

( * ) Notice: Subject to any disclaimer, the term of this patent is extended or adjusted under 35 U.S.C. 154(b) by 0 days.

(21) Appl. No.: 18/572,464

(22) PCT Filed: Jun. 27, 2022

(86) PCT No.: PCT/EP2022/067613
§ 371 (c)(1),
(2) Date: Dec. 20, 2023

(87) PCT Pub. No.: WO2023/274980
PCT Pub. Date: Jan. 5, 2023

(65) Prior Publication Data

US 2025/0133642 A1 Apr. 24, 2025

(30) Foreign Application Priority Data

Jun. 30, 2021 (EP) .................................... 21182967

(51) Int. Cl.
*H05B 47/155* (2020.01)
*A24F 40/465* (2020.01)
(Continued)

(52) U.S. Cl.
CPC ......... *H05B 47/155* (2020.01); *A24F 40/465* (2020.01); *A24F 40/51* (2020.01);
(Continued)

(58) Field of Classification Search
CPC .... H05B 47/155; H05B 47/165; H05B 45/10; A24F 40/53; A24F 40/465; A24F 40/51
See application file for complete search history.

(56) References Cited

U.S. PATENT DOCUMENTS

2016/0206003 A1* 7/2016 Yamada ............... H05B 3/0014
2017/0303592 A1* 10/2017 Cameron ................ A24F 40/60
(Continued)

FOREIGN PATENT DOCUMENTS

EA 037296 B1 3/2021
EP 3791740 A1 * 3/2021 ............. A24F 40/60
(Continued)

OTHER PUBLICATIONS

International Search Report & Written Opinion issued Sep. 19, 2022 in PCT/EP2022/067613, filed on Jun. 27, 2022, 11 pages.
(Continued)

*Primary Examiner* — Alexander H Taningco
*Assistant Examiner* — Pedro C Fernandez
(74) *Attorney, Agent, or Firm* — Oblon, McClelland, Maier & Neustadt, L.L.P.

(57) ABSTRACT

An aerosol-generating device for heating an aerosol-forming substrate to generate an inhalable aerosol during a usage session is provided, the device including: control electronics; and a lighting array including a plurality of light emitters, the control electronics to independently control each light emitter in an off state in which the light emitter does not emit light, a first lighting state in which the light emitter emits light at a first static luminance level, and a second lighting state in which the light emitter emits light at a second static luminance level that is different from the first level, the control electronics to further control each light emitter to be in one of the off state, the first lighting state, and the second lighting state so as to indicate progression of
(Continued)

an operational phase of the device to a user, and the progression of being a progression of the usage session.

14 Claims, 8 Drawing Sheets

(51) Int. Cl.

| | |
|---|---|
| ***A24F 40/51*** | (2020.01) |
| ***A24F 40/53*** | (2020.01) |
| ***F21V 23/00*** | (2015.01) |
| ***H05B 45/10*** | (2020.01) |
| ***H05B 47/165*** | (2020.01) |
| *A24F 40/20* | (2020.01) |
| *A24F 40/57* | (2020.01) |
| *A24F 40/60* | (2020.01) |
| *F21Y 103/10* | (2016.01) |
| *F21Y 115/10* | (2016.01) |

(52) U.S. Cl.

CPC ............ *A24F 40/53* (2020.01); *F21V 23/009* (2013.01); *H05B 45/10* (2020.01); *H05B 47/165* (2020.01); *A24F 40/20* (2020.01); *A24F 40/57* (2020.01); *A24F 40/60* (2020.01); *F21Y 2103/10* (2016.08); *F21Y 2115/10* (2016.08)

(56) References Cited

U.S. PATENT DOCUMENTS

| | | | | |
|---|---|---|---|---|
| 2018/0020725 | A1* | 1/2018 | Alarcon | F21V 33/0004 |
| 2020/0288781 | A1* | 9/2020 | Tang | A24F 42/60 |

FOREIGN PATENT DOCUMENTS

| | | | | |
|---|---|---|---|---|
| EP | 3838019 | A1 * | 6/2021 | A24F 40/65 |
| RU | 2732852 | C2 | 9/2020 | |
| WO | WO 2021/037403 | A1 | 3/2021 | |
| WO | WO 2022/003068 | A1 | 1/2022 | |
| WO | WO 2022/003072 | A1 | 1/2022 | |
| WO | WO 2022/049019 | A1 | 3/2022 | |

OTHER PUBLICATIONS

Extended European Search Report issued Jan. 4, 2022 in European Patent Application No. 21182967.6, 9 pages.

“Waveguide (optics)”, Wikipedia, Retrieved from http://en.wikipedia.org/w/index.php?title=Waveguide_(optics)&oldid=1023521237, Oct. 6, 2021, 4 pages.

“LP8501 Multi-Purpose 9-Output LED Driver”, Texas Instruments, SNVS548D, Sep. 2008, Revised Aug. 2013, 51 pages.

Office Action dated Nov. 28, 2025, issued in corresponding Russian patent application No. 2024101660 (with English translation).

Search Report dated Nov. 27, 2025, issued in corresponding Russian patent application No. 2024101660.

* cited by examiner

AEROSOL-GENERATING DEVICE

The present disclosure relates to an aerosol-generating device in which data concerning the progression of an operational phase of the device is visually conveyed to a user of the device.

Aerosol-generating devices configured to generate an aerosol from an aerosol-forming substrate, such as a tobacco containing substrate, are known in the art. Typically, an inhalable aerosol is generated by the transfer of heat from a heat source to a physically separate aerosol-forming substrate or material, which may be located within, around or downstream of the heat source. An aerosol-forming substrate may be a liquid substrate contained in a reservoir. An aerosol-forming substrate may be a solid substrate. An aerosol-forming substrate may be a component part of a separate aerosol-generating article configured to engage with an aerosol-generating device to form an aerosol. During consumption, volatile compounds are released from the aerosol-forming substrate by heat transfer from the heat source and entrained in air drawn through the aerosol-generating article. As the released compounds cool, they condense to form an aerosol that is inhaled by the consumer.

During use of the aerosol-generating device, changes in one or more parameters of the device may occur. It is desired to provide an aerosol-generating device which is able to efficiently convey data concerning the state of the device to a user.

As used herein, the term "aerosol-generating device" is used to describe a device that interacts with an aerosol-forming substrate of an aerosol-generating article to generate an aerosol. Preferably, the aerosol-generating device is a smoking device that interacts with an aerosol-forming substrate of an aerosol-generating article to generate an aerosol that is directly inhalable into a user's lungs thorough the user's mouth. The aerosol-generating device may be a holder for a smoking article. Preferably, the aerosol-generating article is a smoking article that generates an aerosol that is directly inhalable into a user's lungs through the user's mouth. More preferably, the aerosol-generating article is a smoking article that generates a nicotine-containing aerosol that is directly inhalable into a user's lungs through the user's mouth.

As used herein, the term "aerosol-forming substrate" denotes a substrate consisting of or comprising an aerosol-forming material that is capable of releasing volatile compounds upon heating to generate an aerosol.

According to an aspect of the present invention, there is provided an aerosol-generating device for heating an aerosol-forming substrate to generate an inhalable aerosol during a usage session. The aerosol-generating device comprises: control electronics; and at least one lighting array comprising a plurality of light emitting units. The control electronics are configured to independently control each one of the plurality of light emitting units in at least: i) an off state in which the light emitting unit does not emit light; ii) a first lighting state in which the light emitting unit emits light at a first static luminance level; and iii) a second lighting state in which the light emitting unit emits light at a second static luminance level that is different to the first static luminance level. The control electronics are configured to control each one of the light emitting units to be in one of the off state, the first lighting state and the second lighting state so as to indicate the progression of an operational phase of the aerosol-generating device to a user.

As used herein, the term "light" refers to emissions of electromagnetic radiation which are in the visible range of the electromagnetic spectrum. The visible range of the electromagnetic spectrum is generally understood to encompass wavelengths in a range of about 380 nanometres to about 750 nanometres.

The usage session is a finite usage session; that is a usage session having a start and an end. The duration of the usage session as measured by time may be influenced by use during the usage session. The duration of the usage session may have a maximum duration determined by a maximum time from the start of the usage session. The duration of the usage session may be less than the maximum time if one or more monitored parameters reaches a predetermined threshold before the maximum time from the start of the usage session. By way of example, the one or more monitored parameters may comprise one or more of: i) a cumulative puff count of a series of puffs drawn by a user since the start of the usage session, and ii) a cumulative volume of aerosol evolved from the aerosol-forming substrate since the start of the usage session.

The different static luminance levels of the first and second lighting states in addition to the off state facilitate conveying more data to a user concerning the progression of the operational phase via the first and second lighting states compared to where a lighting unit is controlled to be either fully on or switched off.

The lighting array may be substantially linear. Additionally, the lighting array may extend between a first end and second end of the lighting array. The use of a linear lighting array provides a lighting array with a geometric structure which can efficiently track progression of the operational phase to provide a user with an indication of how the operational phase is progressing.

In a preferred example, the progression of the operational phase of the aerosol-generating device may be the progression of the usage session.

The control electronics may be configured to independently control each one of the plurality of light emitting units in the lighting array in a plurality of lighting states, wherein in each one of the plurality of lighting states the respective light emitting unit emits light at a different static luminance level. The use of different static luminance levels for each one of the plurality of lighting states facilitates data relating to a large number of incremental changes in the operational phase being conveyed to a user. The greater the number of static luminance levels for each light emitting unit, the more data that can be conveyed to the user concerning changes in the operational phase. In this manner, a high degree of granularity in the data concerning the status of the operational phase is able to be conveyed to the user.

Preferably, in each one of the plurality of lighting states the luminance level of light emitted from the respective light emitting unit may be static so that the luminance level remains substantially constant until the light emitting unit leaves that lighting state. The maintaining of a static or constant luminance level for each one of plurality of lighting states helps to ensure that a user is provided with a clear indication of a state of the operational phase. If the luminance level were instead permitted to vary in a given one of the plurality of lighting states, the variation in luminance level may potentially cause uncertainty as to the precise state of the operational phase. Having the control electronics configured to maintain a static or constant luminance level for each one of the plurality of lighting states avoids these disadvantages, and helps to ensure that the lighting states can be clearly distinguished from each other to thereby identify different points in the operational phase.

Conveniently, the control electronics may be configured to control each one of the plurality of light emitting units to remain in the off state, the first lighting state or the second lighting state for a predetermined amount of time, or until a progression of an operational phase of the aerosol-generating device is detected. The predetermined amount of time may be selected so as to provide sufficient time for a user to visually detect the off state or the first and second lighting states. By using detection of progression of an operational phase of the aerosol-generating device as a trigger to change the state of each of the plurality of light emitting units, the continuing existence of the off state, the first lighting state or the second lighting state may be used as an indication that the operational phase remains unchanged.

The control electronics may be configured to detect a progression of an operational phase of the aerosol-generating device by detecting one or more of: a user input, a puff on the device, generation of a predetermined amount of aerosol, or that a time has elapsed since a user input or a puff on the device. The aerosol-generating device may be configured to detect the user input, a puff on the device or generation of a predetermined amount of aerosol, through use of dedicated sensors. Such sensors may include one or more of a temperature sensor, an air flow sensor, a pressure sensor, and a volumetric sensor. The aerosol-generating device may preferably include an electrical heating arrangement for heating of the aerosol-forming substrate. Conveniently, changes in the temperature of the electrical heating arrangement over time may be used in detecting a puff on the aerosol-generating device or in detecting the generation of a predetermined amount of aerosol. The electrical heating arrangement may be a resistive heating arrangement or an inductive heating arrangement. Where the electrical heating arrangement is a resistive heating arrangement, changes in the temperature of the heating arrangement may be determined based on temperature-dependent changes in electrical resistance of a component of the heating arrangement.

The first static luminance level may be more intense than the second static luminance level. The terms "first" and "second" are used here only to indicate that the first and second luminance levels of the respective first and second lighting states are different to each other; unless stated otherwise, the terms "first" and "second" do not require the first static luminance level to occur at an earlier point in time than the second static luminance level. The difference in intensity of the first and second static luminance levels facilitates clearly conveying data to a user concerning progression of the operational phase. The difference in intensity may be used to indicate progression of time, or any other parameter indicative of progression through the operational phase. By way of example, the any other parameter may include one or more of temperature (such as a temperature of an electrical heating arrangement used in heating the aerosol-forming substrate), a cumulative puff count applied to the aerosol-generating device over the course of the usage session, and a cumulative volume of aerosol evolved from the aerosol-forming substrate over the usage session. In a first example, the control electronics may be configured to control each of the lighting units to be in the first lighting state at an early part of the operational phase, and to be in the second lighting state at a later part of the operational phase. For this first example, the operational phase may be the usage session, with the luminance level being reduced over the course of the usage session from the first static luminance level to the second static luminance level. In a second example, the control electronics may be configured to control each of the lighting units to be in the second lighting state at an early part of the operational phase, and to be in the first lighting state at a later part of the operational phase. For this second example, the operational phase may be a pre-heating phase of operation in which a temperature of an electrical heating arrangement of the aerosol-generating device is increased to a predetermined target temperature, with the luminance level being increased over the pre-heating phase to be indicative of the increase of temperature of the electrical heating arrangement.

The plurality of light emitting units may be in the first lighting state during a first phase of progression though the operational phase of the aerosol-generating device. In this manner, the first static luminance level of the first lighting state is associated with the first phase of the progression through the operational phase. By way of example, the first phase may be a predetermined portion of the usage session, or a predetermined portion of a pre-heating phase of operation of an electrical heating arrangement of the aerosol-generating device.

The control electronics may be configured to control each one of the plurality of light emitting units independently to be in the first lighting state initially, to be in the second lighting state after being in the first lighting state, and to be in the off state after being in the second lighting state while indicating the progression of the operational phase of the aerosol-generating device to the user. In this manner, the luminance of each one of the plurality of light emitting units is able to track progression through the operational phase. Where the first static luminance level is more intense than the second static luminance level, the reduction in luminance from the first lighting state to the second lighting state, and then to the off state provides an efficient way of communicating data to a user relating to progression through the operational phase.

The control electronics may be configured to change the state of only one of the plurality of light emitting units in the lighting array at any one time in response to detecting a progression of the operational phase of the aerosol-generating device. In this manner, a change in state of a single one of the plurality of light emitting units is able to communicate to a user data concerning progression through the usage session. The change in state of the single one of the plurality of light emitting units may be a change in one or more of luminance and colour of light emitted by the light emitting unit. As described in preceding paragraphs, the control electronics may be configured to detect a progression of an operational phase of the aerosol-generating device by detecting one or more of: a user input, a puff on the device, generation of a predetermined amount of aerosol, or that a time has elapsed since a user input or a puff on the device.

The control electronics may be configured to control each one of the plurality of light emitting units such that the plurality of light emitting units are in the off state during an n+5th phase of operation of the aerosol-generating device.

The control electronics may be configured to activate the lighting array in two or more colour states, so as to control the colour of light emitted in each lighting state. In this manner, each lighting state may have a colour and a luminance level, thereby further increasing the granularity and complexity of data concerning progression of the operational phase which can be communicated to the user.

Advantageously, each light emitting unit is a light emitting diode (LED). The use of light emitting units in the form of LED's is preferred due to LED's being energy efficient. It is preferred that the aerosol-generating device is sized so as to be handheld and to include a power source to provide portability. The power source may conveniently be in the form of a rechargeable battery. In this context, the energy efficiency associated with LED's makes them particularly suitable for use in such a handheld portable aerosol-generating device having its own power source. Alternatively however, the light emitting units may instead be comprised of one or more liquid crystal displays, or any other electrically powered light source whose energy and size requirements are suitable for use in an aerosol-generating device.

Preferably, the aerosol-generating device may further comprise one or more waveguides configured to direct light generated by the plurality of light emitting units to one or more display windows in the lighting array. As used herein, the term "waveguide" denotes a structure adapted to guide electromagnetic waves of light. The waveguide may conveniently be in the form of one or more optical fibres or light pipes. Conveniently, each of the light emitting units is associated with a corresponding waveguide, so that the light emitted from each light emitting unit is conveyed to the one or more display windows via the corresponding waveguide.

Advantageously, each one of the plurality of light emitting units may comprise a light emitting diode and the control electronics may comprise a light emitting diode control driver and a separate microcontroller. The control driver may be configured to control a supply of electricity from a power source to one or more of the plurality of light emitting diodes under the control of the microcontroller, so as to control each one of the light emitting units to be in one of the off state, or one of the lighting states. The control driver may be configured to control one or both of the voltage or current level of the supply of electricity.

The plurality of light emitting diodes may additionally comprise: a first set of one or more light emitting diodes configured to emit light of a first colour; and a second set of one or more light emitting diodes configured to emit light of a second colour. The light emitting diode control driver may be configured to activate one or more of the light emitting diodes from the first set alone, or from the second set alone, or from both of the first and second sets in combination, so as to control the colour of the lighting array. In this manner, the light emitting diode control driver provides control of the colour in addition to the luminance level of light emitted for the first and second lighting states.

The lighting array may further comprise: a plurality of display windows for communicating light to a user; and one or more waveguides. Each of the one or more waveguides may be connected with a respective one of the first and second set of light emitting diodes at a first portion, and each of the one or more waveguides may be connected with a same one of the display windows in the lighting array, such that the first set and second set of light emitting diodes control the colour of the light communicated via the display window.

Conveniently, the light emitting diode control driver may be configured to control a supply of electricity from a power source to one or more of the plurality of light emitting diodes by a pulse width modulation regime having a predetermined resolution, so as to control the luminance of the one or more of the plurality of light emitting diodes in each one of the lighting states. By way of example, the resolution of the pulse width modulation regime may be 8 bit (having 256 levels), 10 bit (having 1024 levels), or 12 bit (having 4096 levels). The higher the predetermined resolution, the greater the number of discrete static luminance levels of light which is able to be generated by each one of the plurality of light emitting diodes. In this manner, the granularity or level of detail of data conveyed to the user through the different luminance levels may be controlled by the predetermined resolution chosen for the light emitting diode control driver.

Preferably, the control electronics are configured to independently control each one of the light emitting units in the off state, the first lighting state and the second lighting state, such that the light emitted by the light emitting units in the first and second lighting states is one or more of: a usage session light emission, a low energy light emission, a thermal profile light emission, a pause light emission, a state change light emission, a progressing light emission and a pre-heating light emission. By "usage session light emission" is meant a light emission indicative of a power source of the aerosol-generating device containing sufficient energy for completing a predetermined number of usage sessions. By "low energy light emission" is meant a light emission indicative of a power source of the aerosol-generating device containing a level of energy less than or equal to a predetermined threshold level of energy. By "thermal profile light emission" is meant a light emission indicative of selection of one of at least two predetermined thermal profiles of an electrical heating arrangement of the aerosol-generating device. By "pause light emission" is mean a light emission indicative of the aerosol-generating device being in a pause mode. By "state change light emission" is meant a light emission indicative of a change in operational state of the aerosol-generating device. By "progressing light emission" is meant a light emission indicative of progression through the usage session. By "pre-heating light emission" is meant a light emission indicative of progression through a pre-heating phase of operation of an electrical heating arrangement of the aerosol-generating device. Examples relating to these different forms of "light emission" are outlined in the paragraphs below.

Conveniently, the aerosol-generating device may further comprise: a power source coupled to the control electronics. The control electronics may be configured to: determine a level of energy contained in the power source; and compare the determined level of energy with first and second predetermined energy thresholds. The first predetermined energy threshold may correspond to the power source containing sufficient energy to complete a single usage session, and the second predetermined energy threshold may correspond to the power source containing sufficient energy to complete a plurality of usage sessions, preferably two usage sessions. The control electronics may also be configured to: activate the lighting array to generate a single usage session light emission in response to a first state in which the determined level of energy is sufficient to complete a single usage session; and activate the lighting array to generate a plural usage sessions light emission in response to a second state in which the determined level of energy is sufficient to complete two or more usage sessions. The single usage session light emission and the plural usage sessions light emission are different to each other. The single usage session light emission is indicative of the first state and the plural usage sessions light emission is indicative of the second state. In this manner, a user may be provided with a visual indication as to whether the power source has sufficient energy to complete either a single usage session or plural usage sessions. By way of example, the power source may be selected to have an energy capacity sufficient to complete two usage sessions before requiring replacement or recharging, with the plural usage sessions being two usage sessions. However, the energy capacity of the power source may be chosen to enable the completion of more than two usage sessions before requiring replacement or recharging.

The control electronics may be configured to activate a greater proportion of the lighting array to generate the plural usage sessions light emission than to generate the single usage session light emission.

The control electronics may be configured to: activate a first proportion of the lighting array to generate the single usage session light emission in response to the first state; and activate a second proportion of the lighting array to generate the plural usage sessions light emission in response to the second state. The second proportion may form a greater proportion of the length of the lighting array than the first proportion. Preferably, the first proportion of the lighting array may form up to between 45 to 55% of the length of the lighting array and the second proportion of the lighting array may form up to between 90 to 100% of the length of the lighting array.

The control electronics may be configured to activate the lighting array such that the single usage session light emission and the plural usage sessions light emission are different to each other in one or more of luminance and colour. Preferably, the control electronics may be configured to activate the lighting array such that the single usage session light emission has a first predetermined luminance and the plural usage sessions light emission has a second predetermined luminance. The second predetermined luminance may be greater than the first predetermined luminance.

Conveniently, the aerosol-generating device may further comprise a power source coupled to the control electronics. The control electronics may be configured to: determine a level of energy contained in the power source and compare the determined level of energy with a low energy threshold level of energy; and activate the lighting array to generate a low energy light emission in response to the determined level of energy being less than or equal to the low energy threshold level of energy. The low energy light emission is indicative of the determined level of energy being less than or equal to the low energy threshold level of energy. In this manner, a user may be provided with a visual indication of the power source having insufficient energy to complete a full usage session. Where the power source is a rechargeable power source, the low energy light emission may provide the user with a visual indication that the power source requires recharging.

Preferably, the low energy threshold level of energy may be less than or equal to 20% of a predetermined energy capacity of the power source.

The control electronics may be configured to activate the lighting array such that the low energy light emission has a predetermined colour.

The control electronics may be configured to activate a minor proportion of the lighting array to generate the low energy light emission. Preferably, the minor proportion forms less than 15%, or preferably less than 10%, or preferably less than 5% of the length of the lighting array.

The minor proportion may be located at one of a first or a second end of the lighting array.

Conveniently, the aerosol-generating device may further comprise: a power source coupled to the control electronics. The control electronics may be configured to: receive a selection input selecting one of at least a first and a second predetermined thermal profile. Each of the first and second predetermined thermal profiles may define a heating profile for heating of the aerosol-forming substrate by an electrical heating arrangement over the usage session. The first and second predetermined thermal profiles are different to each other. The control electronics may also be configured to: control a supply of energy from the power source to the electrical heating arrangement to heat the aerosol-forming substrate in accordance with the selected thermal profile; and activate the lighting array to generate a first thermal profile light emission in response to selection of the first predetermined thermal profile and activate the lighting array to generate a second thermal profile light emission in response to selection of the second predetermined thermal profile. The first thermal profile light emission is indicative of the selection of the first predetermined thermal profile. The second thermal profile light emission is indicative of the selection of the second predetermined thermal profile. In this manner, a user may be provided with a visual indication as which of the predetermined thermal profiles has been selected for heating of the aerosol-forming substrate.

The second predetermined thermal profile may have a greater intensity than the first predetermined thermal profile. Additionally, the second predetermined thermal profile may be associated with supply of a greater amount of energy from the power source to the electrical heating arrangement over the usage session than for the first predetermined thermal profile.

Conveniently, the aerosol-generating device may comprise a user interface actuatable by a user to select between the first and second predetermined thermal profiles. Preferably, the user interface may comprise a button, or a motion sensor. The control electronics may be configured to generate the selection input in response to the user selecting between the first and second predetermined thermal profiles via the user interface.

The control electronics may be configured to: activate a first proportion of the lighting array to generate the first thermal profile light emission in response to selection of the first predetermined thermal profile; and activate a second proportion of the lighting array to generate the second thermal profile light emission in response to selection of the second predetermined thermal profile. The second proportion may be greater than the first proportion. Preferably, the second proportion may define a greater proportion of the length of the lighting array than the first proportion.

The lighting array may comprise a plurality of lighting elements. The control electronics may be configured to activate a greater number of the plurality of lighting elements to generate the second thermal profile light emission than to generate the first thermal profile light emission.

The control electronics may be configured to activate the lighting array such that the first and second thermal profile light emissions differ from each other in one or more of luminance and colour. Additionally, the control electronics may be configured to activate the lighting array such that the first thermal profile light emission has a first predetermined colour and the second thermal profile light emission has a second predetermined colour. A dominant wavelength of the second thermal profile light emission may be greater in size than a dominant wavelength of the first thermal profile light emission.

Conveniently, the aerosol-generating device may further comprise: a power source coupled to the control electronics. The control electronics may be configured to: control a supply of energy from the power source to an electrical heating arrangement to heat the aerosol-forming substrate at a first temperature level in an aerosol-generating mode; in response to a pause signal, control the supply of energy from the power source to the electrical heating arrangement to heat the aerosol-forming substrate at a second temperature level below the first temperature level in a pause mode; and activate the lighting array to generate a pause light emission in response to the pause signal. The pause light emission is indicative of the aerosol-generating device being in the pause mode. In this manner, a user may be provided with a visual indication of the aerosol-generating device being in the pause mode.

The aerosol-generating device may comprise a motion sensor for detecting a movement of the aerosol-generating device. The motion sensor may be coupled to the control electronics. The control electronics may be configured to use the detected movement to trigger the pause signal. The control electronics may be configured to use the detected movement to trigger the pause signal when the detected movement corresponds to a predetermined movement.

Alternatively, the aerosol-generating device may comprise a motion sensor for detecting a lack of movement of the aerosol-generating device. The motion sensor may be coupled to the control electronics. The control electronics may be configured to use the lack of detected movement to trigger the pause signal. The lack of movement of the aerosol-generating device may be detected by an absence of movement of the device for a predetermined amount of time, or an absence of movement above a certain magnitude for a predetermined amount of time.

The aerosol-generating device may further comprise a user interface and/or a puff detection mechanism for detecting puffs on the device. The control electronics may be configured to trigger the pause signal in response to detecting an absence of a user interaction with the user interface and/or with the puff detection mechanism for a predetermined amount of time.

The control electronics may be configured to use the detected movement to trigger the pause signal when the detected movement corresponds to a predetermined movement.

The aerosol-generating device may comprise an orientation sensor for detecting an orientation of the aerosol-generating device. The orientation sensor may be coupled to the control electronics. The control electronics may be configured to use the detected orientation, or an absence of a change in the detected orientation for a predetermined length of time, to trigger the pause signal. The control electronics may be configured to use the detected orientation to trigger the pause signal when the detected orientation corresponds to a predetermined orientation.

The aerosol-generating device may further comprise a user interface actuatable by a user to initiate the pause mode. Preferably, the user interface may comprise a button.

The control electronics may be configured to generate the pause signal in response to the user initiating the pause mode via the user interface, or in response to detecting an absence of a user interacting with the user interface after a predetermined length of time.

The control electronics may be configured to activate two spatially distinct portions of the lighting array to generate the pause light emission. Preferably, one of the two spatially distinct portions is disposed at the first end of the lighting array and the other of the two spatially distinct portions is disposed at the second end of the lighting array.

The control electronics may be configured to sequentially activate and deactivate the spatially distinct portions to generate the pause light emission. Additionally, the control electronics may be configured to activate and deactivate the spatially distinct portions out of phase with each other to generate the pause light emission.

The control electronics may be configured to activate the spatially distinct portions to change with time in at least one of luminance or wavelength, so as to vary the luminance or colour of the pause light emission with respect to time.

The control electronics may be configured to activate all or part of the lighting array to generate the pause light emission such that a centre portion of the lighting array has a luminance greater than the remainder of the lighting array. The control electronics may be configured to activate all or part of the lighting array to generate the pause light emission such that the luminance of the lighting array progressively decreases when moving from the centre portion towards the first and second ends of the lighting array.

Conveniently, the aerosol-generating device may further comprise: a power source coupled to the control electronics. The control electronics may be configured to: receive an input to change an operational state of the aerosol-generating device; control a supply of energy from the power source to change the operational state; and activate the lighting array to generate a state change light emission in response to the input. The state change light emission is indicative of the receiving of the input to change the operational state. In this manner, a user may be provided with a visual indication of a change in the operational state of the aerosol-generating device.

The change of operational state may comprise activation of the device from an off mode, or reactivation of the device from a pause mode. The reactivation of the device may correspond to a supply of energy from the power source to an electrical heating arrangement being so as to heat the aerosol-forming substrate at a first temperature level in an aerosol-generating mode. The pause mode may correspond to the supply of energy from the power source to the electrical heating arrangement being so as to heat the aerosol-forming substrate at a second temperature level below the first temperature level.

The control electronics may be configured to progressively activate the lighting array over a predetermined time period so as to progressively increase an activated length of the lighting array over the predetermined time period for the state change light emission.

The control electronics may be configured to activate all or part of the lighting array to progressively increase in luminance over a predetermined time period for the state change light emission. The control electronics may be configured to activate all or part of the lighting array such that at the start of the predetermined time period the luminance of the activated part of the lighting array progressively reduces with distance away from a centre of the activated part towards the first and second ends of the lighting array. The luminance may progressively increase over the predetermined time period such that at the end of the predetermined time period the activated part of the lighting array has a uniform luminance over the length of the activated part.

The control electronics may be configured to activate all or part of the lighting array such that the luminance of the activated part of the lighting array is symmetric about a centre of the activated part over the predetermined time period.

Conveniently, the progression of the operational phase of the aerosol-generating device is the progression of the usage session; and the device may further comprise: a power source coupled to the control electronics. The control electronics may be configured to: control a supply of energy from the power source to an electrical heating arrangement over the usage session to heat the aerosol-forming substrate; determine progression through the usage session by reference to a parameter indicative of progression through the usage session; and activate the lighting array to generate a progressing light emission which varies according to progression through the usage session, such that the progressing light emission is indicative of progression through the usage session. In this manner, a user may be provided with a visual indication of progression through the usage session.

The parameter indicative of progression through the usage session may comprise one or more of: a cumulative time elapsed since the start of the usage session, a cumulative puff count of a series of puffs drawn by a user since the start of the usage session, and a cumulative volume of aerosol evolved from the aerosol-forming substrate since the start of the usage session.

The control electronics may be configured to reduce or terminate the supply of energy from the power source to the electrical heating arrangement to complete the usage session upon the occurrence of the cumulative time elapsed since the start of the usage session reaching a predetermined maximum time duration.

The control electronics may be configured to reduce or terminate the supply of energy from the power source to the electrical heating arrangement to complete the usage session upon the first to occur of: i) the cumulative time elapsed since the start of the usage session reaching the predetermined maximum time duration; and ii) the cumulative puff count reaching a predetermined maximum number of puffs.

The control electronics may be configured to reduce or terminate the supply of energy from the power source to the electrical heating arrangement to complete the usage session upon the first to occur of: i) the cumulative time elapsed since the start of the usage session reaching the predetermined maximum time duration; and ii) the cumulative volume of aerosol reaching a predetermined volume limit.

The control electronics may be configured to: activate all or a major portion of the lighting array at the start of the usage session; and progressively deactivate the lighting array so as to progressively reduce an activated length of the lighting array with progression through the usage session. The control electronics may be configured such that on completion of the usage session, no light is emitted from the lighting array.

The lighting array may comprise spatially distinct first and second portions corresponding to respective first and second usage sessions. The control electronics may be configured to: activate the first portion of the lighting array at the start of the first usage session; progressively deactivate the first portion of the lighting array so as to progressively reduce an activated length of the first portion with progression through the first usage session; activate the second portion of the lighting array at the start of the second usage session; and progressively deactivate the second portion of the lighting array so as to progressively reduce an activated length of the second portion with progression through the second usage session. Preferably, the control electronics may be configured such that on completion of the first and second usage sessions, no light is emitted from the respective spatially distinct first and second portions of the lighting array.

The spatially distinct first and second portions may each extend for between 45% to 50% of the length of the lighting array.

Conveniently, the aerosol-generating device may further comprise: a power source coupled to the control electronics. The aerosol-generating device may also be configured to receive an aerosol-generating article comprising the aerosol-forming substrate. The control electronics may be configured to: detect the receiving of the aerosol-generating article by the aerosol-generating device; control a supply of energy from the power source to an electrical heating arrangement to activate a pre-heating phase in which the electrical heating arrangement is heated to a predetermined target temperature; and activate the lighting array to generate a pre-heating light emission which varies according to progression through the pre-heating phase so as to be indicative of progression through the pre-heating phase. In this manner, a user may be provided with a visual indication of progression through the pre-heating phase.

The aerosol-generating device may comprise a cavity for receiving the aerosol-generating article. The aerosol-generating article may comprise an inductively heatable susceptor. The electrical heating arrangement may comprise an inductive heating arrangement coupled to the power source and configured to generate an alternating magnetic field within the cavity for inductively heating the susceptor of the aerosol-generating article when the aerosol-generating article is received in the cavity. The control circuitry may be configured to: generate probe power pulses for intermittently powering on the inductive heating arrangement; and detect a change of at least one property of the inductive heating arrangement due to the presence of the susceptor when an aerosol-generating article is received in the cavity, thereby enabling detection of the aerosol-generating article being received in the cavity.

The at least one property may be an equivalent resistance of the inductive heating arrangement or may be an inductance of the inductive heating arrangement.

The control electronics may be configured to activate the lighting array such that different portions of the lighting array vary in luminance with time and with respect to each other, and the luminance of the lighting array progressively increases over the pre-heating phase.

The control electronics may be configured to activate the lighting array such that a dominant wavelength of the pre-heating light emission progressively increases over the pre-heating phase.

The control electronics may be configured to activate the lighting array so as to progressively increase an activated length of the lighting array with progression through the pre-heating phase.

The control electronics may be configured to activate the lighting array such that during or upon completion of the pre-heating phase the luminance of an activated length of the lighting array progressively increases with distance between first and second opposed ends of the activated length.

The control electronics may be configured to activate the lighting array such that during or upon completion of the pre-heating phase a dominant wavelength of the pre-heating light emission progressively increases with distance between first and second opposed ends of an activated length of the lighting array. Preferably, the dominant wavelength may be within a range of 380 to 750 nanometres, such that during or upon completion of the pre-heating phase the first opposed end defines a blue colour for the pre-heating light emission and the second opposed end defines a red colour for the pre-heating light emission.

The control electronics may be configured such that the lighting array has a uniform luminance along the length of the lighting array upon completion of the pre-heating phase.

Preferably, the aerosol-forming substrate is a solid aerosol-forming substrate. However, the aerosol-forming substrate may comprise both solid and liquid components. Alternatively, the aerosol-forming substrate may be a liquid aerosol-forming substrate.

Preferably, the aerosol-forming substrate comprises nicotine. More preferably, the aerosol-forming substrate comprises tobacco. Alternatively or in addition, the aerosol-forming substrate may comprise a non-tobacco containing aerosol-forming material.

If the aerosol-forming substrate is a solid aerosol-forming substrate, the solid aerosol-forming substrate may comprise, for example, one or more of: powder, granules, pellets, shreds, strands, strips or sheets containing one or more of: herb leaf, tobacco leaf, tobacco ribs, expanded tobacco and homogenised tobacco.

Optionally, the solid aerosol-forming substrate may contain tobacco or non-tobacco volatile flavour compounds, which are released upon heating of the solid aerosol-forming substrate. The solid aerosol-forming substrate may also contain one or more capsules that, for example, include additional tobacco volatile flavour compounds or non-tobacco volatile flavour compounds and such capsules may melt during heating of the solid aerosol-forming substrate.

Optionally, the solid aerosol-forming substrate may be provided on or embedded in a thermally stable carrier. The carrier may take the form of powder, granules, pellets, shreds, strands, strips or sheets. The solid aerosol-forming substrate may be deposited on the surface of the carrier in the form of, for example, a sheet, foam, gel or slurry. The solid aerosol-forming substrate may be deposited on the entire surface of the carrier, or alternatively, may be deposited in a pattern in order to provide a non-uniform flavour delivery during use.

In a preferred embodiment, the aerosol-forming substrate comprises homogenised tobacco material. As used herein, the term "homogenised tobacco material" refers to a material formed by agglomerating particulate tobacco.

Preferably, the aerosol-forming substrate comprises a gathered sheet of homogenised tobacco material. As used herein, the term "sheet" refers to a laminar element having a width and length substantially greater than the thickness thereof. As used herein, the term "gathered" is used to describe a sheet that is convoluted, folded, or otherwise compressed or constricted substantially transversely to the longitudinal axis of the aerosol-generating article.

Preferably, the aerosol-forming substrate comprises an aerosol former. As used herein, the term "aerosol former" is used to describe any suitable known compound or mixture of compounds that, in use, facilitates formation of an aerosol and that is substantially resistant to thermal degradation at the operating temperature of the aerosol-generating article.

Suitable aerosol-formers are known in the art and include, but are not limited to: polyhydric alcohols, such as propylene glycol, triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. Preferred aerosol formers are polyhydric alcohols or mixtures thereof, such as propylene glycol, triethylene glycol, 1,3-butanediol and, most preferred, glycerine.

The aerosol-forming substrate may comprise a single aerosol former. Alternatively, the aerosol-forming substrate may comprise a combination of two or more aerosol formers.

The invention is defined in the claims. However, below there is provided a non-exhaustive list of non-limiting examples. Any one or more of the features of these examples may be combined with any one or more features of another example, embodiment, or aspect described herein.

Example Ex1: An aerosol-generating device for heating an aerosol-forming substrate to generate an inhalable aerosol during a usage session, the aerosol-generating device comprising: control electronics; and at least one lighting array comprising a plurality of light emitting units; wherein the control electronics are configured to independently control each one of the plurality of light emitting units in at least: i) an off state in which the light emitting unit does not emit light; ii) a first lighting state in which the light emitting unit emits light at a first static luminance level; and iii) a second lighting state in which the light emitting unit emits light at a second static luminance level that is different to the first static luminance level; and wherein the control electronics are configured to control each one of the light emitting units to be in one of the off state, the first lighting state and the second lighting state so as to indicate the progression of an operational phase of the aerosol-generating device to a user.

Example Ex2: An aerosol-generating device according to Ex1, wherein the lighting array is substantially linear.

Example Ex3: An aerosol-generating device according to either one of Ex1 or Ex2, wherein the lighting array extends between a first end and second end of the lighting array.

Example Ex4: An aerosol-generating device according to any one of Ex1 to Ex3, wherein the progression of the operational phase of the aerosol-generating device is the progression of the usage session.

Example Ex5: An aerosol-generating device according to any one of Ex1 to Ex4, wherein the control electronics are configured to independently control each one of the plurality of light emitting units in the lighting array in a plurality of lighting states, wherein in each one of the plurality of lighting states the respective light emitting unit emits light at a different static luminance level.

Example Ex6: An aerosol-generating device according to Ex5, wherein in each one of the plurality of lighting states the luminance level of light emitted from the respective light emitting unit is static so that the luminance level remains substantially constant until the light emitting unit leaves that lighting state.

Example Ex7: An aerosol-generating device according to any one of Ex1 to Ex6, wherein the control electronics are configured to control each one of the plurality of light emitting units to remain in the off state, the first lighting state or the second lighting state for a predetermined amount of time, or until a progression of an operational phase of the aerosol-generating device is detected.

Example Ex8: An aerosol-generating device according to claim Ex7, wherein the control electronics are configured to detect a progression of an operational phase of the aerosol-generating device by detecting one or more of: a user input, a puff on the device, generation of a predetermined amount of aerosol, or that a time has elapsed since a user input or a puff on the device.

Example Ex9: An aerosol-generating device according to any one of Ex1 to Ex8, wherein the first static luminance level is more intense than the second static luminance level.

Example Ex10: An aerosol-generating device according to any one of Ex1 to Ex9, wherein the plurality of light emitting units are in the first lighting state during a first phase of progression though the operational phase of the aerosol-generating device.

Example Ex11: An aerosol-generating device according to any one of Ex1 to Ex10, wherein the control electronics are configured to control each one of the plurality of light emitting units independently to be in the first lighting state initially, to be in the second lighting state after being in the first lighting state, and to be in the off state after being in the second lighting state while indicating the progression of the operational phase of the aerosol-generating device to the user.

Example Ex12: An aerosol-generating device according to any one of Ex1 to Ex11, wherein the control electronics are configured to change the state of only one of the plurality of light emitting units in the lighting array at any one time in response to detecting a progression of the operational phase of the aerosol-generating device.

Example Ex13: An aerosol-generating device according to Ex12, wherein the control electronics are configured to detect a progression of an operational phase of the aerosol-generating device by detecting one or more of: a user input, a puff on the device, generation of a predetermined amount of aerosol, or that a time has elapsed since a user input or a puff on the device.

Example Ex14: An aerosol-generating device according to any one of Ex1 to Ex13, wherein the plurality of light emitting units are in the off state during an n+5th phase of operation of the aerosol-generating device.

Example Ex15: An aerosol-generating device according to any one of Ex1 to Ex14, in which the control electronics are configured to activate the lighting array in two or more colour states, so as to control the colour of light emitted in each lighting state.

Example Ex16: An aerosol-generating device according to any one of Ex1 to Ex15, in which each light emitting unit is a light emitting diode.

Example Ex17: An aerosol-generating device according to any one of Ex1 to Ex16, further comprising one or more waveguides configured to direct light generated by the plurality of light emitting units to one or more display windows in the lighting array.

Example Ex18: An aerosol-generating device according any one of Ex1 to Ex17, wherein each one of the plurality of light emitting units comprises a light emitting diode and the control electronics comprises a light emitting diode control driver and a separate microcontroller, the control driver configured to control a supply of electricity from a power source to one or more of the plurality of light emitting diodes under the control of the microcontroller, so as to control each one of the light emitting units to be in one of the off state, or one of the lighting states.

Example Ex19: An aerosol-generating device according to Ex18, in which the plurality of light emitting diodes comprises: a first set of one or more light emitting diodes configured to emit light of a first colour; and a second set of one or more light emitting diodes configured to emit light of a second colour; in which the light emitting diode control driver is configured to activate one or more of the light emitting diodes from the first set alone, or from the second set alone, or from both of the first and second sets in combination, so as to control the colour of the lighting array.

Example Ex20: An aerosol-generating device according to Ex19, wherein the lighting array comprises a plurality of display windows for communicating light to a user; and further comprising one or more waveguides; wherein each of the one or more waveguides is connected with a respective one of the first and second set of light emitting diodes at a first portion, and wherein each of the one or more waveguides is connected with a same one of the display windows in the lighting array, such that the first set and second set of light emitting diodes control the colour of the light communicated via the display window.

Example Ex21: An aerosol-generating device according to any one of Ex18 to Ex20, in which the light emitting diode control driver is configured to control a supply of electricity from a power source to one or more of the plurality of light emitting diodes by a pulse width modulation regime having a predetermined resolution, so as to control the luminance of the one or more of the plurality of light emitting diodes in each one of the lighting states.

Example Ex22: An aerosol-generating device according to any one of Ex1 to Ex21, in which the control electronics are configured to independently control each one of the light emitting units in the off state, the first lighting state and the second lighting state such that the light emitted by the light emitting units in the first and second lighting states is one or more of: a usage session light emission, a low energy light emission, a thermal profile light emission, a pause light emission, a state change light emission, a progressing light emission and a pre-heating light emission.

Example Ex23: An aerosol-generating device according to any one of Ex1 to Ex22, the aerosol-generating device further comprising: a power source coupled to the control electronics; in which the control electronics are configured to: determine a level of energy contained in the power source; compare the determined level of energy with first and second predetermined energy thresholds, the first predetermined energy threshold corresponding to the power source containing sufficient energy to complete a single usage session, the second predetermined energy threshold corresponding to the power source containing sufficient energy to complete a plurality of usage sessions, preferably two usage sessions; activate the lighting array to generate a single usage session light emission in response to a first state in which the determined level of energy is sufficient to complete a single usage session; activate the lighting array to generate a plural usage sessions light emission in response to a second state in which the determined level of energy is sufficient to complete two or more usage sessions; wherein the single usage session light emission and the plural usage sessions light emission are different to each other, in which the single usage session light emission is indicative of the first state and the plural usage sessions light emission is indicative of the second state.

Example Ex24: An aerosol-generating device according to Ex23, in which the control electronics are configured to activate a greater proportion of the lighting array to generate the plural usage sessions light emission than to generate the single usage session light emission.

Example Ex25: An aerosol-generating device according to either one of Ex23 or Ex24, in which the control electronics are configured to: activate a first proportion of the lighting array to generate the single usage session light emission in response to the first state; and activate a second proportion of the lighting array to generate the plural usage sessions light emission in response to the second state; the second proportion forming a greater proportion of the length of the lighting array than the first proportion.

Example Ex26: An aerosol-generating device according to Ex25, in which the first proportion of the lighting array forms up to between 45 to 55% of the length of the lighting array and the second proportion of the lighting array forms up to between 90 to 100% of the length of the lighting array.

Example Ex27: An aerosol-generating device according to any one of Ex23 to Ex26, in which the control electronics are configured to activate the lighting array such that the single usage session light emission and the plural usage sessions light emission are different to each other in one or more of luminance and colour.

Example Ex28: An aerosol-generating device according to Ex27, in which the control electronics are configured to activate the lighting array such that the single usage session light emission has a first predetermined luminance and the plural usage sessions light emission has a second predetermined luminance, the second predetermined luminance being greater than the first predetermined luminance.

Example Ex29: An aerosol-generating device according to any one of Ex1 to Ex28, further comprising: a power source coupled to the control electronics; in which the control electronics are configured to: determine a level of energy contained in the power source and compare the determined level of energy with a low energy threshold level of energy; and activate the lighting array to generate a low energy light emission in response to the determined level of energy being less than or equal to the low energy threshold level of energy, in which the low energy light emission is indicative of the determined level of energy being less than or equal to the low energy threshold level of energy.

Example Ex30: An aerosol-generating device according to Ex29, in which the low energy threshold level of energy is less than or equal to 20% of a predetermined energy capacity of the power source.

Example Ex31: An aerosol-generating device according to either one of Ex29 or Ex30, in which the control electronics are configured to activate the lighting array such that the low energy light emission has a predetermined colour.

Example Ex32: An aerosol-generating device according to any one of Ex29 to Ex31, in which the control electronics are configured to activate a minor proportion of the lighting array to generate the low energy light emission.

Example Ex33: An aerosol-generating device according to Ex32, in which the minor proportion forms less than 15%, or preferably less than 10%, or preferably less than 5% of the length of the lighting array.

Example Ex34: An aerosol-generating device according to either one of Ex32 or Ex33, in which the minor proportion is located at one of a first or a second end of the lighting array.

Example Ex35: An aerosol-generating device according to any one of the preceding claims, further comprising: a power source coupled to the control electronics; in which the control electronics are configured to: receive a selection input selecting one of at least a first and a second predetermined thermal profile, in which each of the first and second predetermined thermal profiles define a heating profile for heating of the aerosol-forming substrate by an electrical heating arrangement over the usage session, the first and second predetermined thermal profiles being different to each other; control a supply of energy from the power source to the electrical heating arrangement to heat the aerosol-forming substrate in accordance with the selected thermal profile; and activate the lighting array to generate a first thermal profile light emission in response to selection of the first predetermined thermal profile and activate the lighting array to generate a second thermal profile light emission in response to selection of the second predetermined thermal profile, in which the first thermal profile light emission is indicative of the selection of the first predetermined thermal profile and the second thermal profile light emission is indicative of the selection of the second predetermined thermal profile.

Example Ex36: An aerosol-generating device according to Ex35, in which the second predetermined thermal profile has a greater intensity than the first predetermined thermal profile.

Example Ex37: An aerosol-generating device according to Ex36, in which the second predetermined thermal profile is associated with supply of a greater amount of energy from the power source to the electrical heating arrangement over the usage session than for the first predetermined thermal profile.

Example Ex38: An aerosol-generating device according to any one of Ex35 to Ex37, in which the aerosol-generating device comprises a user interface actuatable by a user to select between the first and second predetermined thermal profiles, preferably wherein the user interface comprises a button, or a motion sensor.

Example Ex39: An aerosol-generating device according to Ex38, in which the control electronics are configured to generate the selection input in response to the user selecting between the first and second predetermined thermal profiles via the user interface.

Example Ex40: An aerosol-generating device according to any one of Ex35 to Ex39, in which the control electronics are configured to: activate a first proportion of the lighting array to generate the first thermal profile light emission in response to selection of the first predetermined thermal profile; and activate a second proportion of the lighting array to generate the second thermal profile light emission in response to selection of the second predetermined thermal profile; the second proportion being greater than the first proportion.

Example Ex41: An aerosol-generating device according to Ex40, in which the second proportion defines a greater proportion of the length of the lighting array than the first proportion.

Example Ex42: An aerosol-generating device according to any one of Ex35 to Ex41, in which the lighting array comprises a plurality of lighting elements, the control electronics configured to activate a greater number of the plurality of lighting elements to generate the second thermal profile light emission than to generate the first thermal profile light emission.

Example Ex43: An aerosol-generating device according to any one of Ex35 to Ex42, in which the control electronics are configured to activate the lighting array such that the first and second thermal profile light emissions differ from each other in one or more of luminance and colour.

Example Ex44: An aerosol-generating device according to Ex43, in which the control electronics are configured to activate the lighting array such that the first thermal profile light emission has a first predetermined colour and the second thermal profile light emission has a second predetermined colour, in which a dominant wavelength of the second thermal profile light emission is greater in size than a dominant wavelength of the first thermal profile light emission.

Example Ex45: An aerosol-generating device according to any one of Ex1 to Ex44, further comprising: a power source coupled to the control electronics; in which the control electronics are configured to: control a supply of energy from the power source to an electrical heating arrangement to heat the aerosol-forming substrate at a first temperature level in an aerosol-generating mode; in response to a pause signal, control the supply of energy from the power source to the electrical heating arrangement to heat the aerosol-forming substrate at a second temperature level below the first temperature level in a pause mode; and activate the lighting array to generate a pause light emission in response to the pause signal, in which the pause light emission is indicative of the aerosol-generating device being in the pause mode.

Example Ex46: An aerosol-generating device according to Ex45, in which the aerosol-generating device comprises a motion sensor for detecting a movement of the aerosol-generating device, the motion sensor coupled to the control electronics, the control electronics configured to use the detected movement to trigger the pause signal.

Example Ex47: An aerosol-generating device according to Ex45, in which the aerosol-generating device comprises a motion sensor for detecting a lack of movement of the aerosol-generating device, the motion sensor coupled to the control electronics, the control electronics configured to use the lack of detected movement to trigger the pause signal.

Example Ex48: An aerosol-generating device according to Ex47, wherein the lack of movement of the aerosol-generating device is detected by an absence of movement of the device for a predetermined amount of time, or an absence of movement above a certain magnitude for a predetermined amount of time.

Example Ex49: An aerosol-generating device according to Ex45, further comprising a user interface and/or a puff detection mechanism for detecting puffs on the device, wherein the control electronics are configured to trigger the pause signal in response to detecting an absence of a user interaction with the user interface and/or with the puff detection mechanism for a predetermined amount of time.

Example Ex50: An aerosol-generating device according to Ex46, in which the control electronics are configured to use the detected movement to trigger the pause signal when the detected movement corresponds to a predetermined movement.

Example Ex51: An aerosol-generating device according to any one of Ex45 to Ex50, in which the aerosol-generating device comprises an orientation sensor for detecting an orientation of the aerosol-generating device, the orientation sensor coupled to the control electronics, the control electronics configured to use the detected orientation, or an absence of a change in the detected orientation for a predetermined length of time, to trigger the pause signal.

Example Ex52: An aerosol-generating device according to Ex51, in which the control electronics are configured to use the detected orientation to trigger the pause signal when the detected orientation corresponds to a predetermined orientation.

Example Ex53: An aerosol-generating device according to any one of Ex45 to Ex52, in which the aerosol-generating device further comprises a user interface actuatable by a user to initiate the pause mode, preferably wherein the user interface comprises a button.

Example Ex54: An aerosol-generating device according to Ex53, in which the control electronics are configured to generate the pause signal in response to the user initiating the pause mode via the user interface, or in response to detecting an absence of a user interacting with the user interface after a predetermined length of time.

Example Ex55: An aerosol-generating device according to any one of Ex45 to Ex54, in which the control electronics are configured to activate two spatially distinct portions of the lighting array to generate the pause light emission.

Example Ex56: An aerosol-generating device according to Ex55, in which one of the two spatially distinct portions is disposed at the first end of the lighting array and the other of the two spatially distinct portions is disposed at the second end of the lighting array.

Example Ex57: An aerosol-generating device according to either one of Ex55 or Ex56, in which the control electronics are configured to sequentially activate and deactivate the spatially distinct portions to generate the pause light emission.

Example Ex58: An aerosol-generating device according to Ex57, in which the control electronics are configured to activate and deactivate the spatially distinct portions out of phase with each other to generate the pause light emission.

Example Ex59: An aerosol-generating device according to any one of Ex55 to Ex58, in which the control electronics are configured to activate the spatially distinct portions to change with time in at least one of luminance or wavelength, so as to vary the luminance or colour of the pause light emission with respect to time.

Example Ex60: An aerosol-generating device according to any one of Ex45 to Ex54, in which the control electronics are configured to activate all or part of the lighting array to generate the pause light emission such that a centre portion of the lighting array has a luminance greater than the remainder of the lighting array.

Example Ex61: An aerosol-generating device according to Ex60, in which the control electronics are configured to activate all or part of the lighting array to generate the pause light emission such that the luminance of the lighting array progressively decreases when moving from the centre portion towards the first and second ends of the lighting array.

Example Ex62: An aerosol-generating device according to any one of Ex1 to Ex61 further comprising: a power source coupled to the control electronics; in which the control electronics are configured to: receive an input to change an operational state of the aerosol-generating device; control a supply of energy from the power source to change the operational state; and activate the lighting array to generate a state change light emission in response to the input, in which the state change light emission is indicative of the receiving of the input to change the operational state.

Example Ex63: An aerosol-generating device according to Ex62, in which the change of operational state comprises activation of the device from an off mode, or reactivation of the device from a pause mode.

Example Ex64: An aerosol-generating device according to Ex63, in which the reactivation of the device corresponds to a supply of energy from the power source to an electrical heating arrangement being so as to heat the aerosol-forming substrate at a first temperature level in an aerosol-generating mode; and in which the pause mode corresponds to the supply of energy from the power source to the electrical heating arrangement being so as to heat the aerosol-forming substrate at a second temperature level below the first temperature level.

Example Ex65: An aerosol-generating device according to any one of Ex62 to Ex64, in which the control electronics are configured to progressively activate the lighting array over a predetermined time period so as to progressively increase an activated length of the lighting array over the predetermined time period for the state change light emission.

Example Ex66: An aerosol-generating device according to any one of Ex62 to Ex65, in which the control electronics are configured to activate all or part of the lighting array to progressively increase in luminance over a predetermined time period for the state change light emission.

Example Ex67: An aerosol-generating device according to Ex66, in which the control electronics are configured to activate all or part of the lighting array such that at the start of the predetermined time period the luminance of the activated part of the lighting array progressively reduces with distance away from a centre of the activated part towards the first and second ends of the lighting array, with the luminance progressively increasing over the predetermined time period such that at the end of the predetermined time period the activated part of the lighting array has a uniform luminance over the length of the activated part.

Example Ex68: An aerosol-generating device according to either one of Ex66 or Ex67, in which the control electronics are configured to activate all or part of the lighting array such that the luminance of the activated part of the lighting array is symmetric about a centre of the activated part over the predetermined time period.

Example Ex69: An aerosol-generating device according to any one of Ex1 to Ex68, wherein the progression of the operational phase of the aerosol-generating device is the progression of the usage session; and the device further comprises: a power source coupled to the control electronics; in which the control electronics are configured to: control a supply of energy from the power source to an electrical heating arrangement over the usage session to heat the aerosol-forming substrate; determine progression through the usage session by reference to a parameter indicative of progression through the usage session; and activate the lighting array to generate a progressing light emission which varies according to progression through the usage session, such that the progressing light emission is indicative of progression through the usage session.

Example Ex70: An aerosol-generating device according to Ex69, in which the parameter indicative of progression through the usage session comprises one or more of: a cumulative time elapsed since the start of the usage session, a cumulative puff count of a series of puffs drawn by a user since the start of the usage session, and a cumulative volume of aerosol evolved from the aerosol-forming substrate since the start of the usage session.

Example Ex71: An aerosol-generating device according to Ex70, in which the control electronics are configured to reduce or terminate the supply of energy from the power source to the electrical heating arrangement to complete the usage session upon the occurrence of the cumulative time elapsed since the start of the usage session reaching a predetermined maximum time duration.

Example Ex72: An aerosol-generating device according to Ex71, in which the control electronics are configured to reduce or terminate the supply of energy from the power source to the electrical heating arrangement to complete the usage session upon the first to occur of: i) the cumulative time elapsed since the start of the usage session reaching the predetermined maximum time duration; and ii) the cumulative puff count reaching a predetermined maximum number of puffs.

Example Ex73: An aerosol-generating device according to either one of Ex71 or Ex72, in which the control electronics are configured to reduce or terminate the supply of energy from the power source to the electrical heating arrangement to complete the usage session upon the first to occur of: i) the cumulative time elapsed since the start of the usage session reaching the predetermined maximum time duration; and ii) the cumulative volume of aerosol reaching a predetermined volume limit.

Example Ex74: An aerosol-generating device according to any one of Ex69 to Ex73, in which the control electronics are configured to: activate all or a major portion of the lighting array at the start of the usage session; progressively deactivate the lighting array so as to progressively reduce an activated length of the lighting array with progression through the usage session.

Example Ex75: An aerosol-generating device according to Ex74, in which the control electronics are configured such that on completion of the usage session, no light is emitted from the lighting array.

Example Ex76: An aerosol-generating device according to any one of Ex69 to Ex75, in which the lighting array comprises spatially distinct first and second portions corresponding to respective first and second usage sessions, wherein the control electronics are configured to: activate the first portion of the lighting array at the start of the first usage session; progressively deactivate the first portion of the lighting array so as to progressively reduce an activated length of the first portion with progression through the first usage session; activate the second portion of the lighting array at the start of the second usage session; progressively deactivate the second portion of the lighting array so as to progressively reduce an activated length of the second portion with progression through the second usage session.

Example Ex77: An aerosol-generating device according to Ex76, in which the control electronics are configured such that on completion of the first and second usage sessions, no light is emitted from the respective spatially distinct first and second portions of the lighting array.

Example Ex78: An aerosol-generating device according to either one of Ex76 or Ex77, in which the spatially distinct first and second portions each extend for between 45% to 50% of the length of the lighting array.

Example Ex79: An aerosol-generating device according to any one of Ex1 to Ex78 further comprising: a power source coupled to the control electronics; in which the aerosol-generating device is configured to receive an aerosol-generating article comprising the aerosol-forming substrate; wherein the control electronics are configured to: detect the receiving of the aerosol-generating article by the aerosol-generating device; control a supply of energy from the power source to an electrical heating arrangement to activate a pre-heating phase in which the electrical heating arrangement is heated to a predetermined target temperature; and activate the lighting array to generate a pre-heating light emission which varies according to progression through the pre-heating phase so as to be indicative of progression through the pre-heating phase.

Example Ex80: An aerosol-generating device according to Ex79, in which: the aerosol-generating device comprises a cavity for receiving the aerosol-generating article, the aerosol-generating article comprising an inductively heatable susceptor; the electrical heating arrangement comprises an inductive heating arrangement coupled to the power source and configured to generate an alternating magnetic field within the cavity for inductively heating the susceptor of the aerosol-generating article when the aerosol-generating article is received in the cavity; the control circuitry configured to: generate probe power pulses for intermittently powering on the inductive heating arrangement; and detect a change of at least one property of the inductive heating arrangement due to the presence of the susceptor when an aerosol-generating article is received in the cavity, thereby enabling detection of the aerosol-generating article being received in the cavity.

Example Ex81: An aerosol-generating device according to Ex80, in which the at least one property is an equivalent resistance of the inductive heating arrangement or an inductance of the inductive heating arrangement.

Example Ex82: An aerosol-generating device according to any one of Ex79 to Ex81, in which the control electronics are configured to activate the lighting array such that different portions of the lighting array vary in luminance with time and with respect to each other, and the luminance of the lighting array progressively increases over the pre-heating phase.

Example Ex83: An aerosol-generating device according to any one of Ex79 to Ex82, in which the control electronics are configured to activate the lighting array such that a dominant wavelength of the pre-heating light emission progressively increases over the pre-heating phase.

Example Ex84: An aerosol-generating device according to any one of Ex79 to Ex83, in which the control electronics are configured to activate the lighting array so as to progressively increase an activated length of the lighting array with progression through the pre-heating phase.

Example Ex85: An aerosol-generating device according to any one of Ex79 to Ex84, in which the control electronics are configured to activate the lighting array such that during or upon completion of the pre-heating phase the luminance of an activated length of the lighting array progressively increases with distance between first and second opposed ends of the activated length.

Example Ex86: An aerosol-generating device according to any one of Ex79 to Ex85, in which the control electronics are configured to activate the lighting array such that during or upon completion of the pre-heating phase a dominant wavelength of the pre-heating light emission progressively increases with distance between first and second opposed ends of an activated length of the lighting array.

Example Ex87: An aerosol-generating device according to Ex86, in which the dominant wavelength is within a range of 380 to 750 nanometres, such that during or upon completion of the pre-heating phase the first opposed end defines a blue colour for the pre-heating light emission and the second opposed end defines a red colour for the pre-heating light emission.

Example Ex88: An aerosol-generating device according to any one of Ex79 to Ex87, in which the control electronics are configured such that the lighting array has a uniform luminance along the length of the lighting array upon completion of the pre-heating phase.

Examples will now be further described with reference to the figures, in which.

Figure 1:
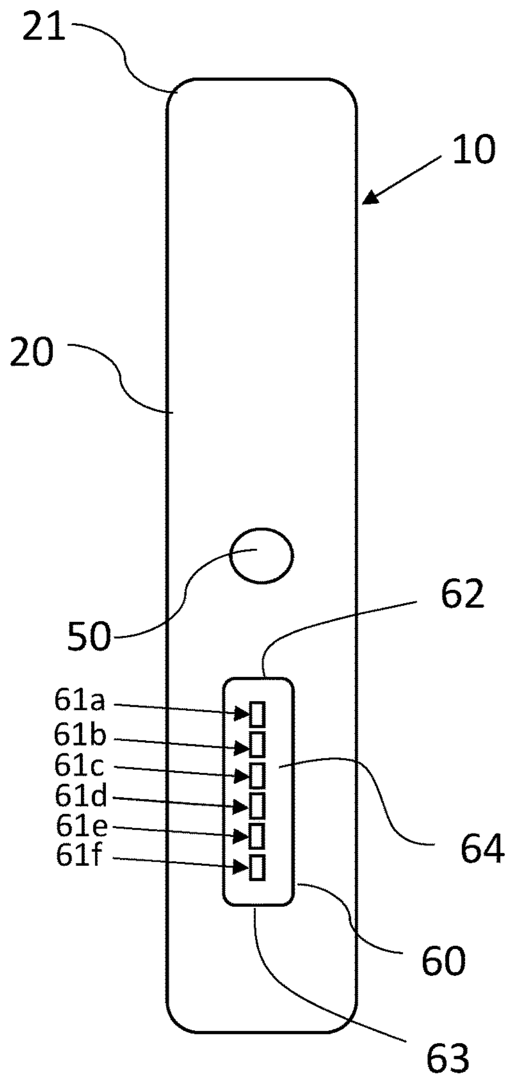
FIG. 1 illustrates a schematic side view of an aerosol-generating device.
Figure 2:
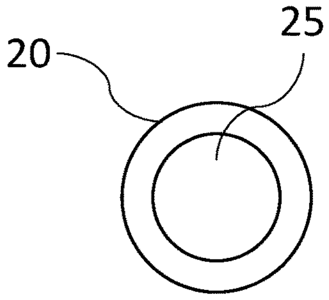
FIG. 2 illustrates a schematic upper end view of the aerosol-generating device of FIG. 1.
Figure 3:
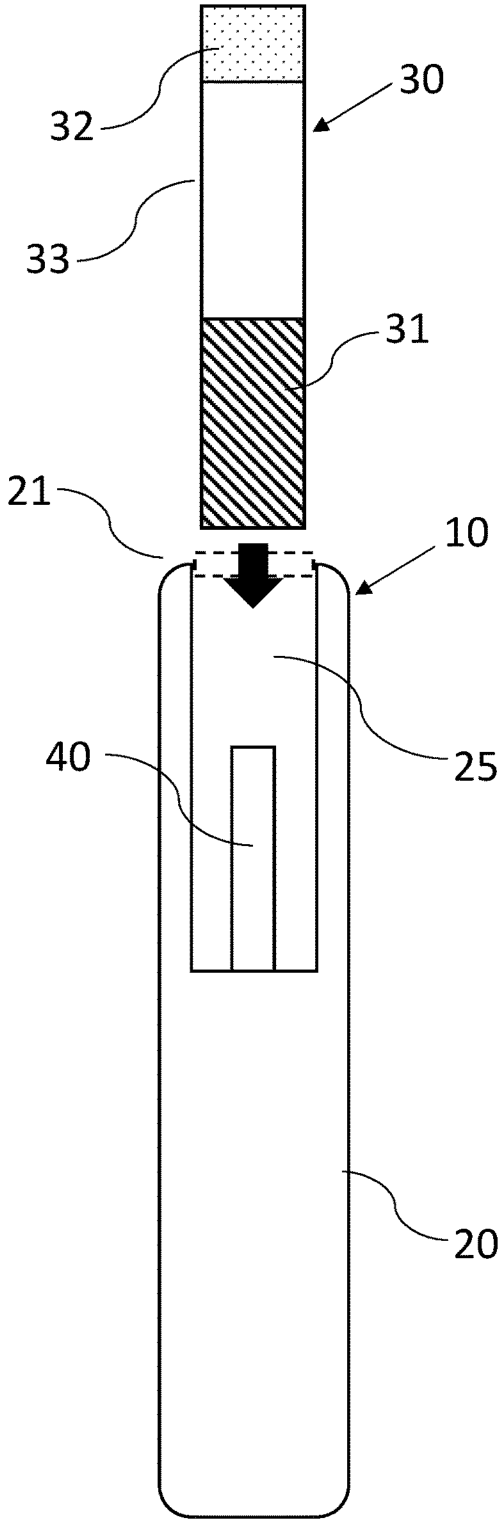
FIG. 3 illustrates a schematic cross-sectional side view of the aerosol-generating device of FIG. 1 and an aerosol-generating article for use with the device.

An exemplary aerosol-generating device 10 is a hand-held aerosol generating device, and has an elongate shape defined by a housing 20 that is substantially circularly cylindrical in form (see FIGS. 1 and 2). As shown in FIGS. 2 and 3, the aerosol-generating device 10 comprises an open cavity 25 located at a proximal end 21 of the housing 20 for receiving an aerosol-generating article 30. Additionally, the aerosol-generating device 10 further has an electrically operated heater element 40 arranged to heat at least an aerosol-forming substrate 31 of the aerosol-generating article 30 when the aerosol-generating article is received in the cavity 25 (see FIG. 3).

The aerosol-generating device is configured to receive the aerosol-generating article 30. As shown in FIG. 3, the aerosol-generating article 30 has the form of a cylindrical rod, the rod formed by a combination of the aerosol-forming substrate 31 and a filter element 32. The aerosol-forming substrate 31 and filter element 32 are co-axially aligned and enclosed in a wrapper 33 of cigarette paper. The aerosol-forming substrate 31 is a solid aerosol-forming substrate comprising tobacco. However, in alternative embodiments (not shown), the aerosol-forming substrate 31 may instead be a liquid aerosol-forming substrate or formed of a combination of liquid and solid aerosol-forming substrates. The filter element 32 serves as a mouthpiece of the aerosol-generating article 30. The aerosol-generating article 30 has a diameter substantially equal to the diameter of the cavity 25 of the device 10 and a length longer than a depth of the cavity 25. When the aerosol-generating article 30 is received in the cavity 25 of the device 10, the portion of the article containing the filter element 32 extends outside of the cavity and may be drawn on by a user, in a similar manner to a conventional cigarette.

A lighting array 60 is incorporated into the housing 20 of the aerosol-generating device 10 (see FIG. 1). The lighting array 60 is formed of a linear arrangement of six light emitting diodes 61*a* . . . f extending between first and second ends 62, 63 of the lighting array. The lighting array 60 also has a display window 64 which forms part of the exterior surface of the housing 20 and is transparent to light. As will be described in more detail below, in use, light generated by each of the light emitting diodes 61*a* . . . f is directed towards the display window 64 so as to be visible to a user of the aerosol-generating device 10.

Figure 4:
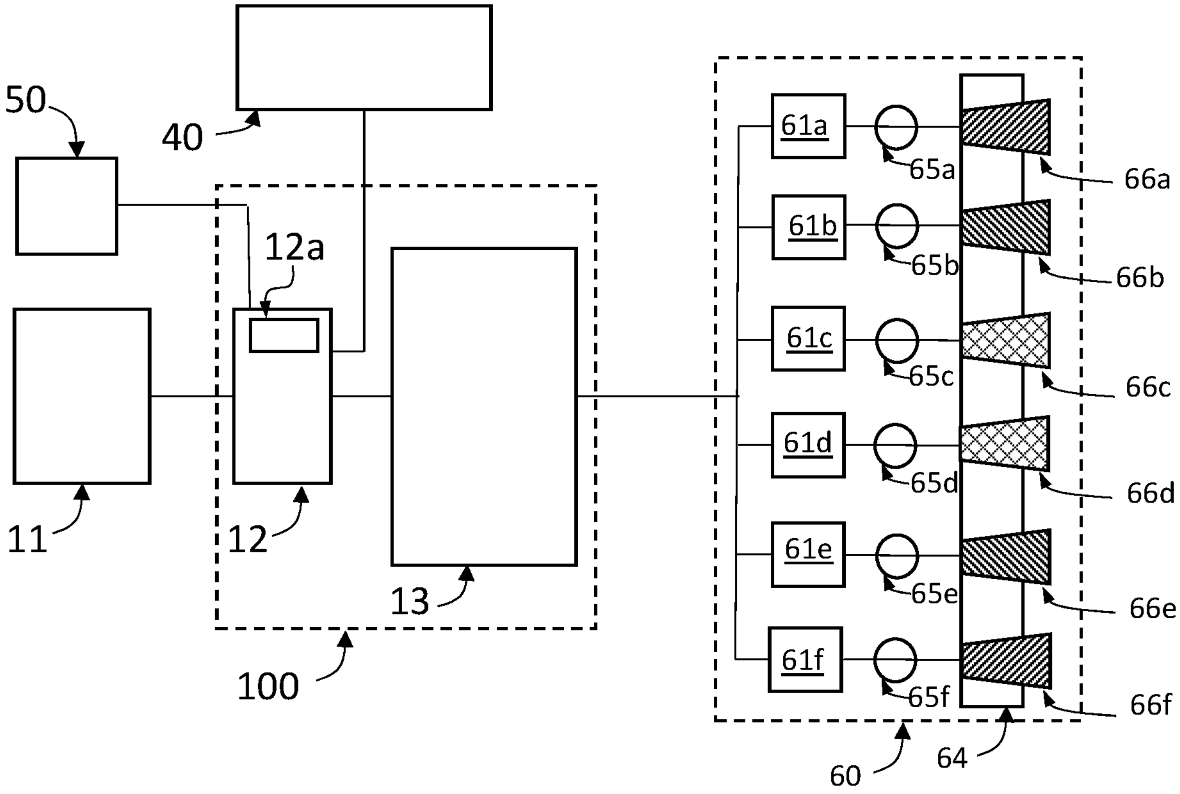
FIG. 4 is a block diagram providing a schematic illustration of various electronic components of the aerosol-generating device of FIGS. 1 to 3 and their interactions.

A battery 11 and microcontroller 12 are coupled to each other and located within the housing 20 (see FIG. 4). The microcontroller 12 also incorporates a memory module 12*a*. The microcontroller 12 is in turn coupled to both the heater element 40 and a lighting control driver 13. The microcontroller 12 and lighting control driver 13 collectively form a control electronics section 100 of the aerosol-generating device 10. The lighting control driver 13 is coupled to each of the light emitting diodes 61*a* . . . f. Waveguides 65*a* . . . f are provided between the light emitting diodes 61*a* . . . f and the display window 64. Each one of the waveguides 65*a* . . . f is associated with a respective one of the light emitting diodes 61*a* . . . f, so that, in use, each waveguide functions to direct light generated by an associated one of the light emitting diodes to the display window 64. The waveguides 65*a* . . . f are in the form of discrete lengths of optical fibre.

The memory module 12*a* contains instructions for execution by the microcontroller 12 and the lighting control driver 13 during use of the device 10. The instructions stored in the memory module 12*a* include data on two or more user-selectable predetermined thermal profiles for the heater element 40, criteria determining the duration of a usage session, plus other data and information relevant to control and operation of the aerosol-generating device 10. When activated, the microcontroller 12 accesses the instructions contained in the memory module 12*a* and controls a supply of energy from the battery 11 to the heater element 40 according to the instructions contained in the memory module 12*a*. The microcontroller 12 also controls a supply of energy to the lighting control driver 13. In turn, the lighting control driver 13 individually controls a supply of electricity to each of the light emitting diodes 61*a* . . . f, such that each light emitting diode emits light 66*a* . . . f at one of a plurality of discrete static luminance levels under the control of the lighting control driver (see FIG. 4). The three different forms of cross-hatching used in FIG. 4 for the light 66*a* . . . f generated by different ones of the light emitting diodes 61*a* . . . f represent three different static luminance levels.

For the point in time shown in FIG. 4, the luminance of the lighting array 60 is symmetric about the centre of the lighting array. So, the centrally located two light emitting diodes 61*c, d* are independently controlled by the lighting control driver 13 to emit light at a first predetermined static luminance level, the neighbouring light emitting diodes 61*b, e* independently controlled to emit light at a second predetermined static luminance level, and the outermost light emitting diodes 61*a, f* independently controlled to emit light at a third predetermined static luminance level.

In use, a user first inserts the aerosol-generating article 30 into the cavity 25 of the aerosol-generating device 10 (as shown by the arrow in FIG. 3) and turns on the device 10 by pressing a user button 50 to activate the heater element 40 to start a usage session. The button 50 is electro-mechanically coupled to the microcontroller 12 (see FIG. 4). In the embodiment shown, the button 50 also serves as a means for the user to select a given one of the predetermined thermal profiles stored in the memory module 12*a*. For the embodiment shown, a double-press of the button 50 functions to select a first predetermined thermal profile and a triple-press of the button functions to select a second predetermined thermal profile. However, in alternative embodiments (not shown), an alternative user interface may be provided with which a user can interact to select a desired one of the first and second predetermined thermal profiles. Such an alternative user interface may be in the form of a touch sensitive panel with which a user may engage a finger to select a desired one of the predetermined thermal profiles, the touch sensitive panel coupled to the microcontroller 12. Alternatively, the alternative user interface may include a motion or orientation sensor coupled to the microcontroller 12, in which a motion or gesture of the device 10 in a predetermined manner is detected by the sensor and serves as a means of selecting a specific one of the predetermined thermal profiles. The first and second predetermined thermal profiles differ from each other in their intensity, with the second predetermined thermal profile having a greater intensity than the first predetermined thermal profile. The second predetermined thermal profile is associated with supply of a greater amount of energy from the battery 11 to the heater element 40 over the usage session than for the first predetermined thermal profile.

After activation, the temperature of the heater element 40 is increased in a pre-heating phase from an ambient temperature to a predetermined target temperature for heating the aerosol-forming substrate 31 according to the selected predetermined thermal profile. On attainment of the predetermined target temperature, the usage session commences. Over the usage session, the heater element 40 heats the aerosol-forming substrate 31 of the article 30 such that volatile compounds of the aerosol-forming substrate are released and atomised to form an aerosol. The user draws on the filter element 32 of the article 30 and inhales the aerosol generated from the heated aerosol-forming substrate 31. The microcontroller 12 is configured to control the supply of energy from the battery 11 to maintain the heater element 40 at an approximately constant level as a user puffs on the article 30. The heater element 40 continues to heat the aerosol-generating article 30 in accordance with the selected predetermined thermal profile until an end of the usage session. At the end of the usage session, the heater element 40 is deactivated and allowed to cool. The usage session has a maximum duration defined by the first to occur of i) 6 minutes elapsing from activation of the heater element 40, or ii) the application by a user of 12 consecutive puffs to the aerosol-generating article 30. In an alternative embodiment, the maximum duration of the usage session is instead defined by the first to occur of i) 6 minutes elapsing from activation of the heater element 40, or ii) a cumulative volume of aerosol evolved from the aerosol-forming substrate over the usage session reaching a predetermined volume. In the illustrated embodiment, the heater element 40 is a resistance heater element. However, in other embodiments (not shown), the heater element 40 is instead in the form of a susceptor arranged within a fluctuating magnetic field such that it is heated by induction.

At the end of the usage session, the aerosol-generating article 30 is removed from the device 10 for disposal, and the device may be coupled to an external power source for charging of the battery 11 of the device.

Figure 5:
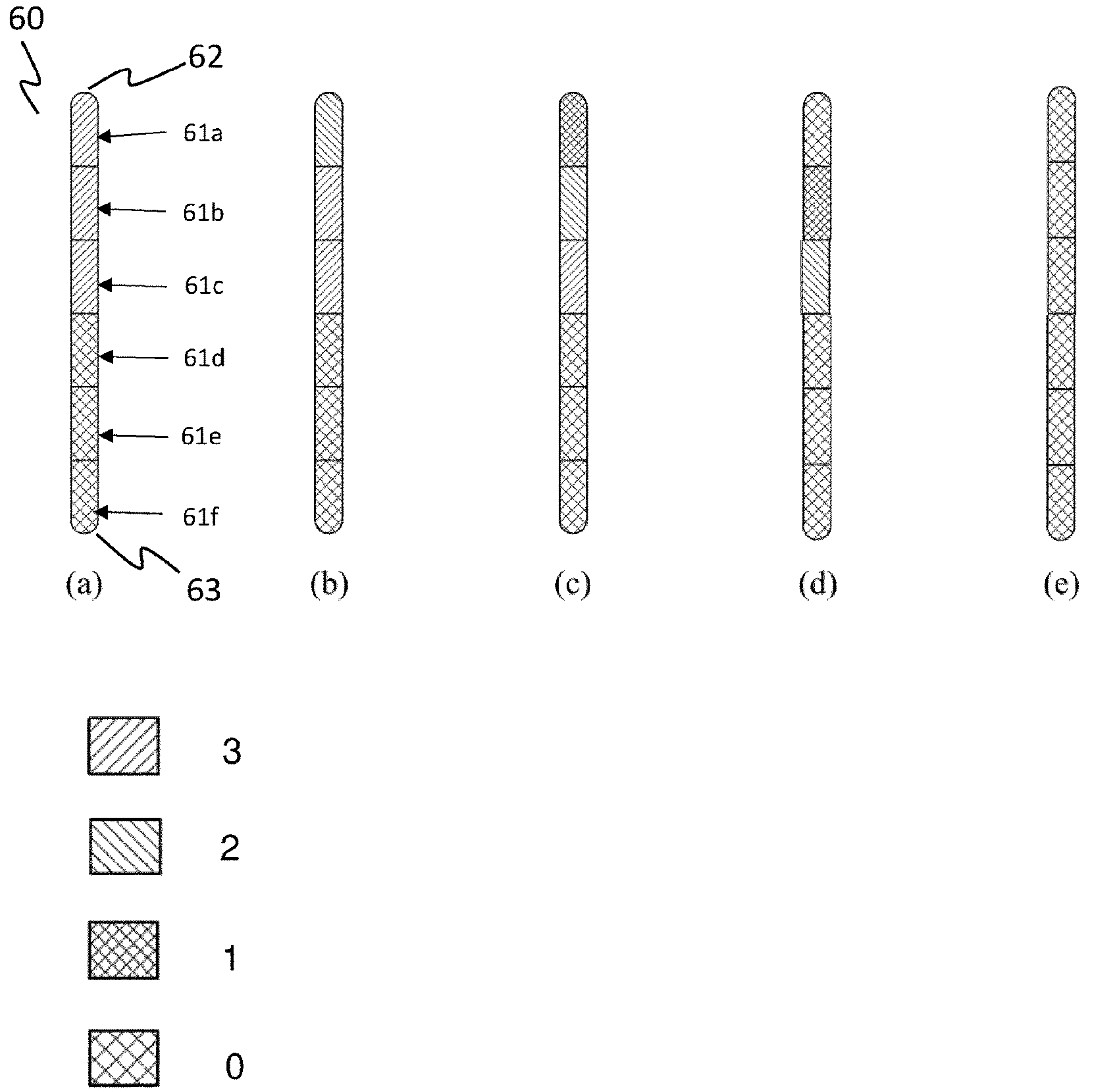
FIG. 5 is a first example illustrating operation of a lighting array provided on the aerosol-generating device of FIGS. 1 to 4, with progression through a usage session.
Figure 6:
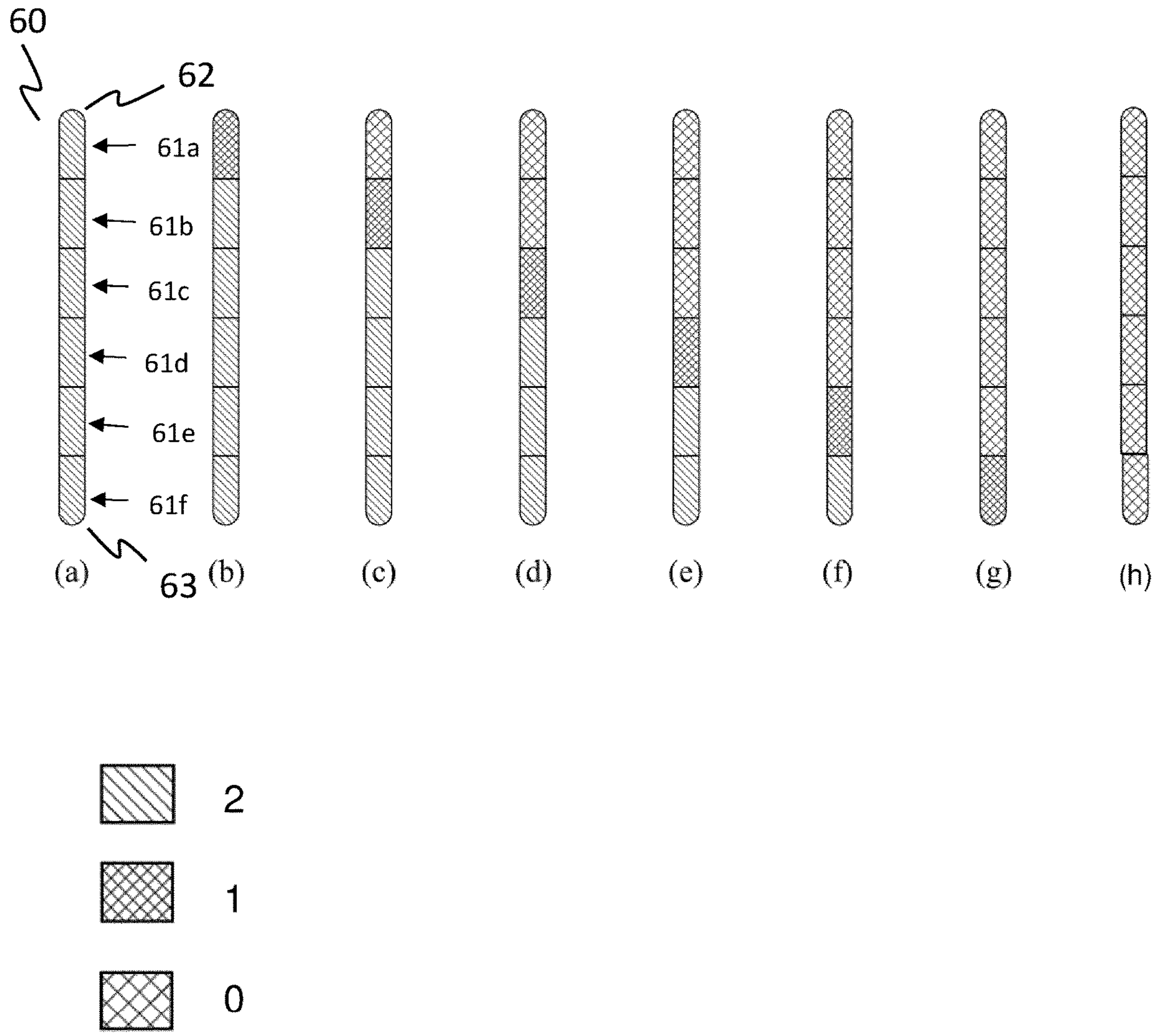
FIG. 6 is a second example illustrating operation of the lighting array provided on the aerosol-generating device of FIGS. 1 to 4, with progression through a usage session.
Figure 7:
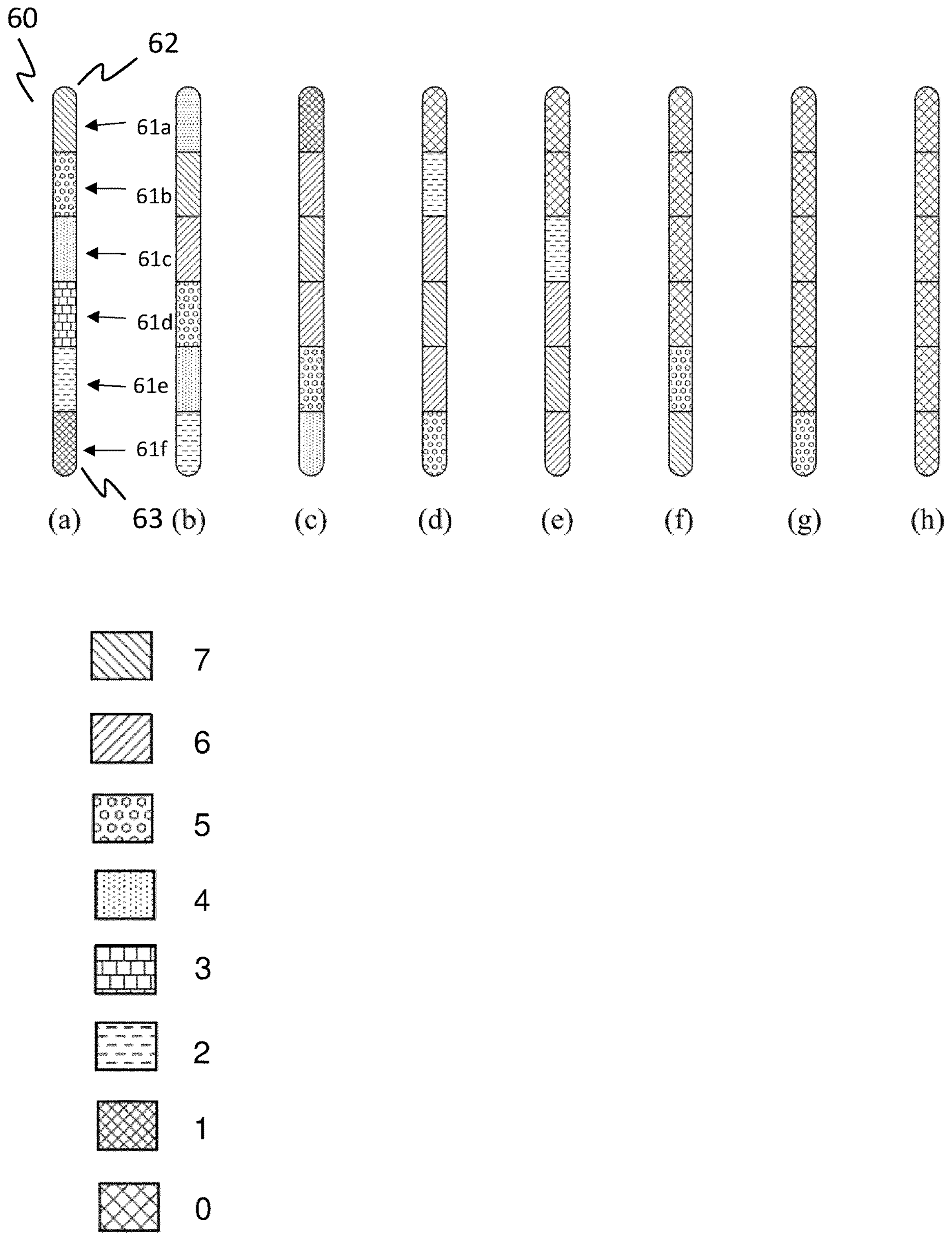
FIG. 7 is a third example illustrating operation of the lighting array provided on the aerosol-generating device of FIGS. 1 to 4, with progression through a usage session.

In various embodiments illustrated in FIGS. 5 to 7, the lighting control driver 13 individually controls the supply of electricity to each of the light emitting diodes 61*a* . . . f over the course of the usage session to provide a user with an indication of progression through the usage session.

For the embodiment of FIG. 5, light emitting diodes 61*a* . . . c form an upper half of the lighting array 60, with light emitting diodes 61*d* . . . f forming a lower half of the lighting array. The light emitting diodes of the upper and lower halves of the lighting array 60 each extend for around 50% of the length of the lighting array. The lighting control driver 13 is configured to control the supply of energy from the battery 11 so as to progressively reduce the static luminance level of light emitted by each of the light emitting diodes 61*a* . . . c in the upper half of the lighting array 60 over the course of the usage session, commencing with the uppermost first light emitting diode 61*a*. As shown in the legend for FIG. 5, the light emitting diodes 61*a* . . . c are controlled by the lighting control driver 13 to emit light having one of three predetermined static luminance levels, or to be in a deactivated state in which no light is emitted. The predetermined static luminance levels are designated as levels 3, 2 and 1 in order of decreasing luminance, with the deactivated state numbered as level 0. At the start of the usage session, all of the light emitting diodes 61*a* . . . c in the upper half of the lighting array 60 are controlled to emit light having a maximum static luminance level, i.e. level 3. Over the course of the usage session, the lighting control driver 13 adjusts the supply of energy from the battery 11 to each of the light emitting diodes 61*a* . . . c to progressively reduce the static luminance level of the light emitted by the light emitting diodes 61*a* . . . c from level 3, to level 2, to level 1 and finally to level 0. The effect of the lighting control driver 13 is to progressively deactivate the light emitting diodes 61*a* . . . c in the upper half of the lighting array 60 to progressively reduce an activated length of the upper half of the lighting array with progression through the usage session. At the end of the usage session, all of the light emitting diodes 61*a* . . . c of the upper half of the lighting array are in a deactivated state, i.e. in level 0 (see FIG. 5(*e*)).

For the duration of this usage session, the light emitting diodes 61*d* . . . f in the lower half of the lighting array 60 remain deactivated with a luminance level of 0.

In another embodiment (not shown), where a user commences a second usage session, the light emitting diodes 61*d* . . . f which form the lower half of the lighting array 60 are controlled by the lighting control driver 13 in a similar manner to the light emitting diodes 61*a* . . . c of the upper half of the lighting array for the earlier usage session. In this context, the second usage session follows the earlier usage session and is powered by the energy remaining in the battery 11 after earlier usage session. The battery 11 would not be recharged between the earlier and second usage sessions. So, at the start of the second usage session, all of the light emitting diodes 61*d* . . . f in the lower half of the lighting array 60 are controlled to emit light having the maximum static luminance level, i.e. level 3. Over the course of the usage session, the lighting control driver 13 adjusts the supply of energy to each of the light emitting diodes 61*d* . . . f to progressively reduce the static luminance level of the light emitted by the light emitting diodes 61*d* . . . f from level 3 down to level 0, starting with light emitting diode 61*d*. At the end of the second usage session, all of the light emitting diodes 61*d* . . . f of the lower half of the lighting array would be in a deactivated state, i.e. in level 0. For the duration of this second usage session, the light emitting diodes 61*a* . . . c in the upper half of the lighting array remain deactivated with a luminance level of 0.

The embodiment of FIG. 6 differs from that of FIG. 5 in progressively reducing the static luminance level of all of the light emitting diodes 61*a* . . . f forming the full length of the lighting array 60 over a usage session. A further difference of the embodiment of FIG. 6 relative to that of FIG. 5 is that the light emitting diodes 61*a* . . . f are controlled by the lighting control driver 13 to emit light having one of two (rather than three) predetermined static luminance levels (designated as level 2 and level 1 in FIG. 6 in order of decreasing luminance), or to be in a deactivated state in which no light is emitted (designated as level 0 in FIG. 6). At the start of the usage session, all of the light emitting diodes 61*a* . . . c in the upper half of the lighting array 60 are controlled by the lighting control driver 13 to emit light having a maximum static luminance level, i.e. level 2. As shown in FIGS. 6(*a*) to 6(*h*), over the course of the usage session, the lighting control driver 13 adjusts the supply of energy to each of the light emitting diodes 61*a* . . . f to progressively reduce the static luminance level of the light emitted by the light emitting diodes 61*a* . . . f from level 2, to level 1 and finally to level 0. The effect of the lighting control driver 13 is to progressively deactivate the light emitting diodes 61*a* . . . f over the full length of the lighting array 60 to progressively reduce an activated length of the lighting array with progression through the usage session. At the end of the usage session, all of the light emitting diodes 61*a* . . . f of the lighting array are in a deactivated state, i.e. in level 0 (see FIG. 6(*h*)).

The embodiment of FIG. 7 shares the characteristic of the embodiment of FIG. 6 in using all of the light emitting diodes 61*a* . . . f forming the full length of the lighting array 60 to provide an indication of progression through a usage session. Each of the light emitting diodes 61*a* . . . f are controlled by the lighting control driver 13 to emit light having one of seven predetermined static luminance levels (designated as levels 7, 6, 5, 4, 3, 2 and 1 in FIG. 7 in order of decreasing luminance), or to be in a deactivated state in which no light is emitted (designated as level 0 in FIG. 7). At the start of the usage session, all of the light emitting diodes 61*a* . . . f are activated by the lighting control driver 13 to each emit light at a different one of the predetermined static luminance levels (see FIG. 7(*a*)), with the luminance level progressing decreasing along the length of the lighting array between light emitting diode 61*a* (emitting light at luminance level 7) to light emitting diode 61*f* (emitting light at luminance level 1). As shown in FIGS. 7(*a*) to 7(*h*), over the course of the usage session, the lighting control driver 13 adjusts the supply of energy to each of the light emitting diodes 61*a* . . . f so that at a given time instant, a single one of the light emitting diodes emits light at a static luminance level higher than the remaining light emitting diodes; this single light emitting diode is referred to the "peak luminance light emitting diode". With progression through the usage session, different ones of the light emitting diodes 61*a* . . . f become the peak luminance light emitting diode, with the peak luminance light emitting diode effectively travelling down along the length of the lighting array 60 over the usage session. The luminance level of the remaining light emitting diodes progressively reduces with increasing distance away from whichever of the diodes happens to be the peak luminance light emitting diode. However, the lighting control driver 13 also operates to adjust the supply of energy to each of the light emitting diodes 61*a* . . . f so that with progression through the usage session, the overall luminance level of light emitted from the lighting array 60 progressively reduces. At the end of the usage session, all of the light emitting diodes 61*a* . . . f of the lighting array are in a deactivated state, i.e. in level 0 (see FIG. 7(*h*)).

Figure 8:
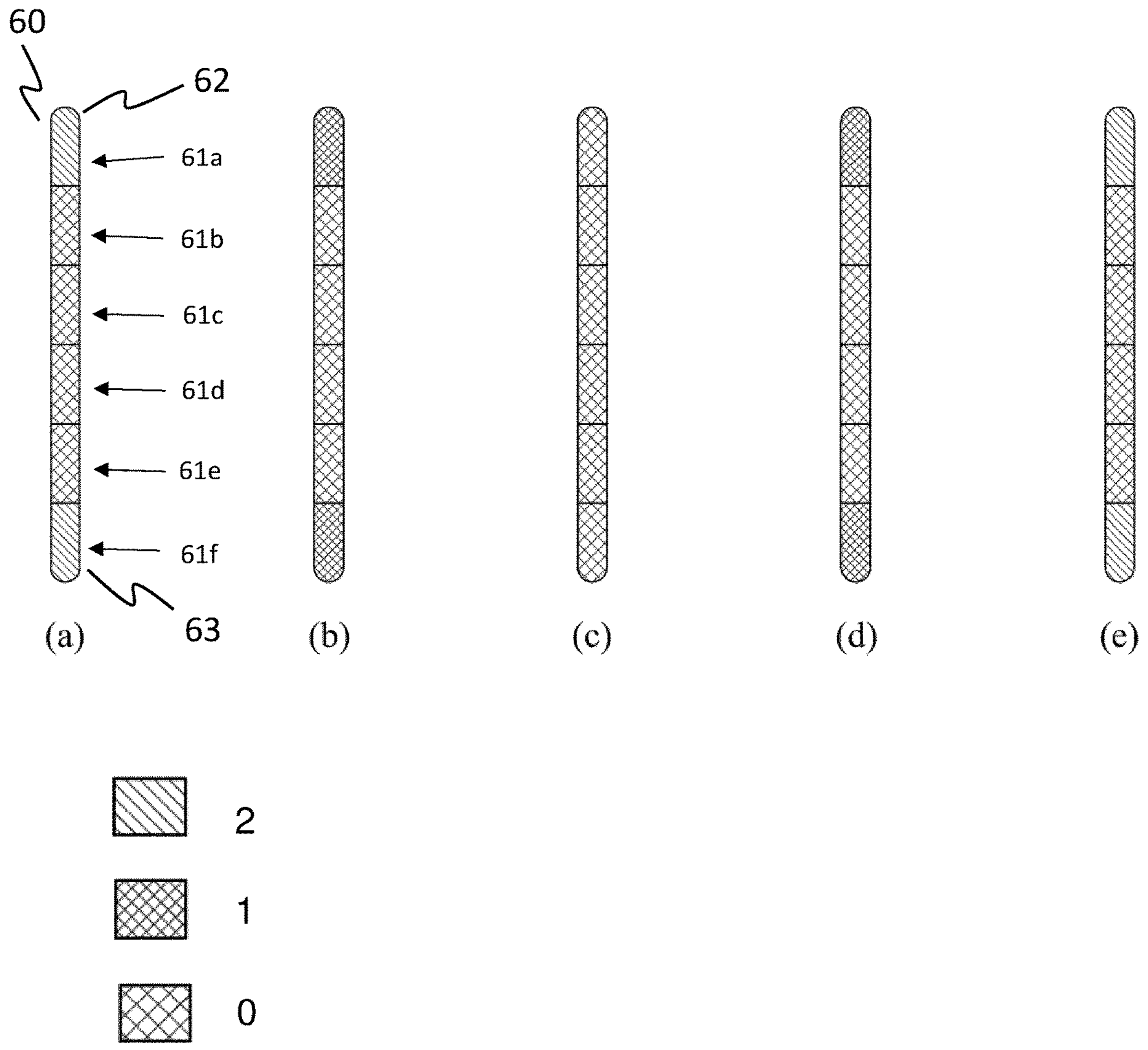
FIG. 8 is a fourth example illustrating operation of the lighting array provided on the aerosol-generating device of FIGS. 1 to 4, with progression through a pause mode of operation.
Figure 9:
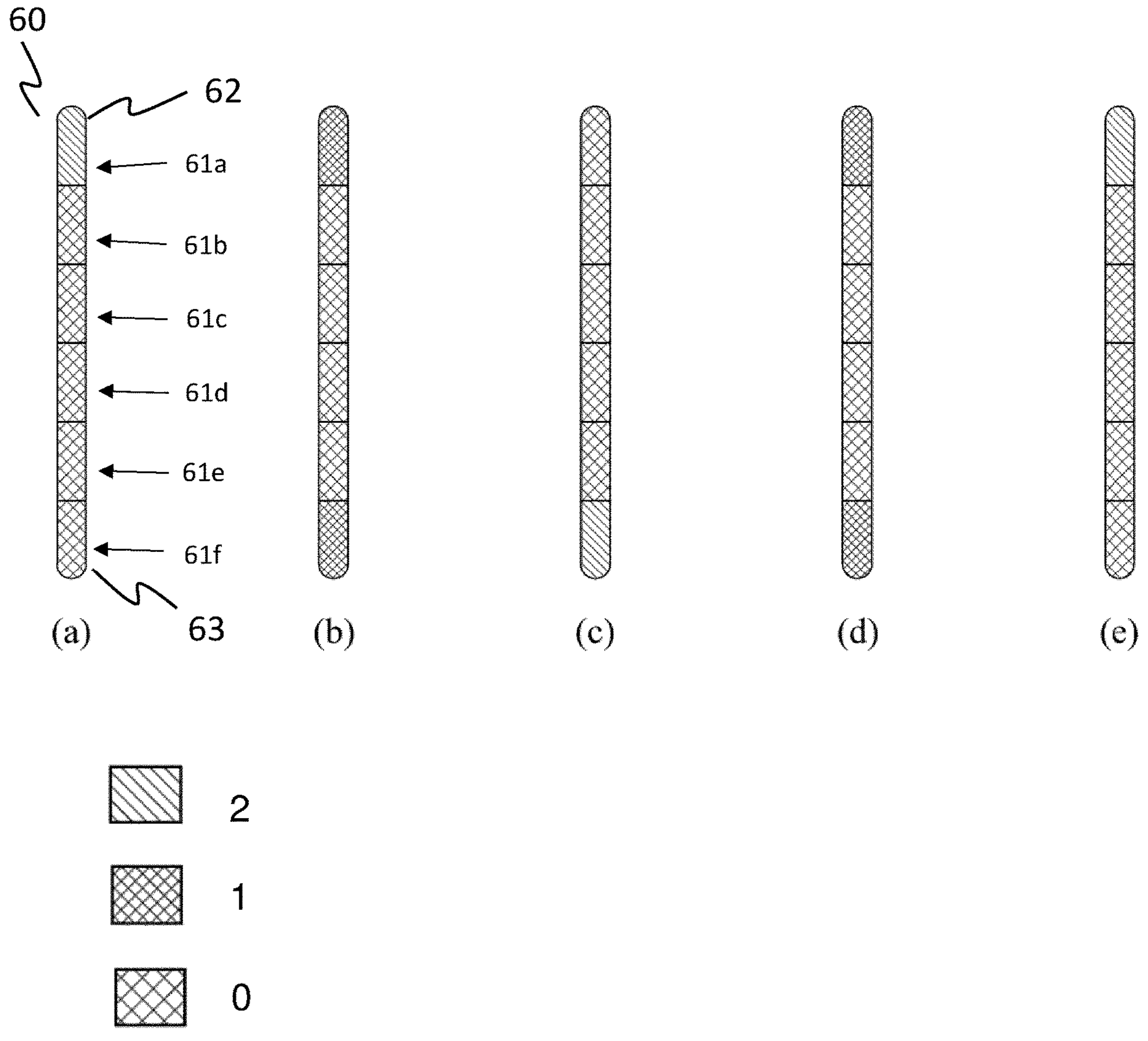
FIG. 9 is a fifth example illustrating operation of the lighting array provided on the aerosol-generating device of FIGS. 1 to 4, with progression through a pause mode of operation.
Figure 10:
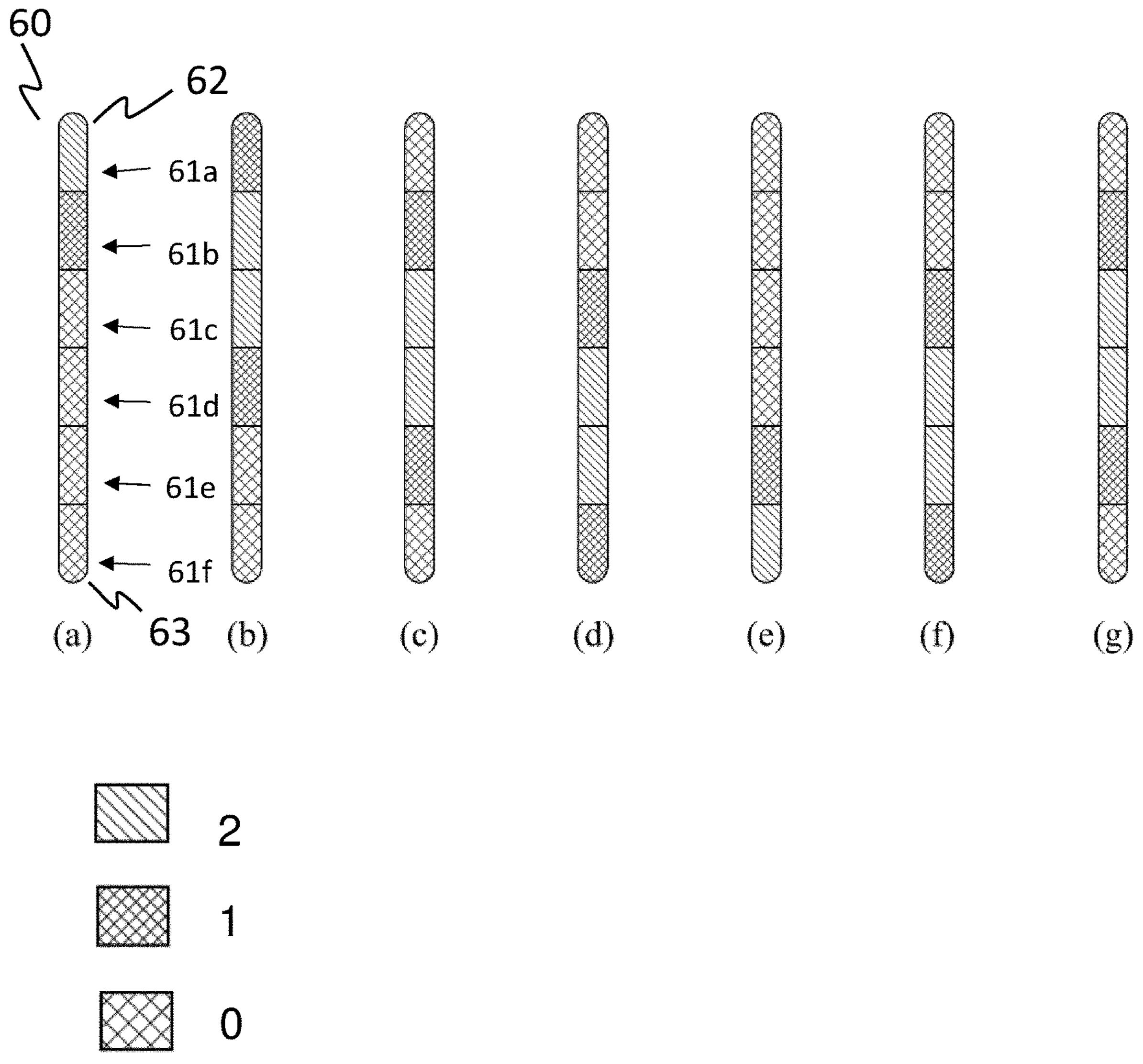
FIG. 10 is a sixth example illustrating operation of the lighting array provided on the aerosol-generating device of FIGS. 1 to 4, with progression through a pause mode of operation.

In various embodiments illustrated in FIGS. 8 to 10, the lighting control driver 13 individually controls the supply of energy to each of the light emitting diodes 61*a* . . . f over the course of a pause mode of operation of the aerosol-generating device 10. For the embodiment shown and described, the pause mode of operation is activated (and later deactivated) by a user pressing the user button 50. However, in alternative embodiments (not shown), an alternative user interface may be provided with which a user can interact to activate (and later deactivate) the pause mode. Such an alternative user interface may be in the form of a touch sensitive panel with which a user may engage their finger to activate and deactivate the pause mode, with the touch sensitive panel being coupled to the microcontroller 12. Alternatively, the alternative user interface may include a motion sensor or orientation sensor coupled to the microcontroller 12, in which a motion or orientation of the device 10 in a predetermined manner is detected by the sensor and serves as a means of activating and deactivating the pause mode. When the pause mode is activated, the microcontroller 12 adjusts the supply of energy from the battery to the heater element 40 to reduce a temperature level of the heater element to below a temperature associated with aerosol being evolved from the aerosol-forming substrate 31.

For the embodiment of FIG. 8, the lighting control driver 13 is configured to control the supply of energy from the battery 11 to the light emitting diodes 61*a* . . . f of the lighting array 60 to vary the static luminance level of light emitted from the spatially distinct light emitting diodes 61*a*, *f* located at opposite ends 62, 63 of the lighting array 60. As shown in the legend for FIG. 8, the light emitting diodes 61*a*, *f* are controlled by the lighting control driver 13 to emit light having one of two predetermined static luminance levels, or to be in a deactivated state in which no light is emitted. In the legend for FIG. 8, the predetermined static luminance levels are designated as levels 2 and 1, in order of decreasing luminance, with the deactivated state numbered as level 0. FIGS. 8(*a*) to 8(*e*) show how the lighting control driver 13 controls the luminance of the light generated by light emitting diodes 61*a, f* over a single cycle. This cycle is repeated for as long as the aerosol-generating device 10 remains in the pause mode. At the start of the usage session, the light emitting diodes 61*a, f* are controlled to emit light having a maximum static luminance level, i.e. level 2 (see FIG. 8(*a*)). Subsequently, the lighting control driver 13 adjusts the supply of energy to light emitting diodes 61*a, f* to emit light having a lower static luminance level, i.e. level 1 (see FIG. 8(*b*)). Subsequently, the lighting control driver 13 adjusts the supply of energy to light emitting diodes 61*a, f* to deactivate both of the light emitting diodes, i.e. level 0 (see FIG. 8(*c*)). FIGS. 8(*d*) and 8(*e*) show how the static luminance level of light emitted by the light emitting diodes 61*a, f* is then progressively increased back to level 1 and then back to level 2. Throughout the period of time or cycle represented by FIGS. 8(*a*) to 8(*e*), the light emitting diodes 61*b* . . . e located between light emitting diodes 61*a, f* remain in a deactivated state, i.e. in level 0. For the embodiment of FIGS. 8(*a*) to 8(*e*), the luminance level of lighting emitting diode 61*a* is adjusted over the cycle so as to be in phase with and to match the luminance level of light emitting diode 61*f*.

The embodiment of FIG. 9 differs from that of FIG. 8 in that the light emitting diodes 61*a, f* located at opposite ends 62, 63 of the lighting array 60 are adjusted over the cycle so as to be out of phase with each other. So, when the light emitting diode 61*a* is controlled by the lighting control driver 13 to emit light with predetermined static luminance level 2, the lighting emitting diode 61*f* located at the opposite end of the lighting array 61 is instead controlled to be in a deactivated state. Halfway through the cycle (as represented by FIG. 9(*c*)), the converse is true with light emitting diode 61*f* controlled to emit light with predetermined static luminance level 2 and light emitting diode 61*a* now deactivated.

For the embodiment of FIG. 10, the lighting control driver 13 controls the supply of energy from the battery 11 so as to adjust the static luminance level of each of the light emitting diodes 61*a* . . . f whilst the aerosol-generating device 10 remains in the pause mode of operation. The lighting control driver 13 functions to control the light emitting diodes 61*a* . . . f to emit light having one of two predetermined static luminance levels, or to be in a deactivated state. In the legend for FIG. 10, the predetermined static luminance levels are designated as levels 2 and 1, in order of decreasing luminance, with the deactivated state numbered as level 0. FIGS. 10(*a*) to 10(*g*) show how the lighting control driver 13 controls the luminance of light emitted by the light emitting diodes 61*a* . . . f over a predetermined period of time whilst the device 10 remains in the pause mode. When the pause mode is initiated, the lighting control driver 13 adjusts the luminance level of the light emitted by light emitting diodes 61*a* . . . f in accordance with FIG. 10(*a*), in which the uppermost light emitting diode 61*a* emits light at a maximum static luminance level (i.e. at level 2), the neighbouring light emitting diode 61*b* emits light with a lower static luminance level (i.e. at level 1), with all of the remaining light emitting diodes 61*c* . . . f being in a deactivated state (i.e. at level 0). Over the predetermined period of time, the lighting control driver 13 adjusts the supply of energy to the light emitting diodes 61*a* . . . f so that a single or neighbouring pair of the light emitting diodes 61*a* . . . f emit light at the peak static luminance level (i.e. level 2). With progression over the predetermined period of time, different single ones or neighbouring pairs of the light emitting diodes 61*a* . . . f emit a bar of light at the peak static luminance level (i.e. level 2). The bar of light at the peak static luminance level effectively travels down along the length of the lighting array over FIGS. 10(*a*) to 10(*e*), and then travels back up along the lighting array over FIGS. 10(*f*) and 10(*g*) until being centrally located on the lighting array as shown in FIG. 10(*g*). The luminance level of the remaining light emitting diodes progressively decreases with increasing distance away from those ones of the light emitting diodes which generate the bar of light at the peak static luminance level. At the end of the predetermined period of time covered by FIGS. 10(*a*) to 10(*g*), the luminance of the light emitted by the lighting array 60 is symmetric about the centre of the lighting array.

For the purpose of the present description and of the appended claims, except where otherwise indicated, all numbers expressing amounts, quantities, percentages, and so forth, are to be understood as being modified in all instances by the term "about". Also, all ranges include the maximum and minimum points disclosed and include any intermediate ranges therein, which may or may not be specifically enumerated herein. In this context, therefore, a number "A" is understood as "A"±10% of "A". Within this context, a number "A" may be considered to include numerical values that are within general standard error for the measurement of the property that the number "A" modifies. The number "A", in some instances as used in the appended claims, may deviate by the percentages enumerated above provided that the amount by which "A" deviates does not materially affect the basic and novel characteristic(s) of the claimed invention. Also, all ranges include the maximum and minimum points disclosed and include any intermediate ranges therein, which may or may not be specifically enumerated herein.

The invention claimed is:

1. An aerosol-generating device for heating an aerosol-forming substrate to generate an inhalable aerosol during a usage session, the aerosol-generating device comprising:

control electronics; and at least one lighting array comprising a plurality of light emitting units, wherein the control electronics are configured to independently control each light emitting unit of the plurality of light emitting units in at least:

i) an off state in which said each light emitting unit does not emit light, ii) a first lighting state in which said each light emitting unit emits light at a first static luminance level, and iii) a second lighting state in which said each light emitting unit emits light at a second static luminance level that is different from the first static luminance level, wherein the control electronics are further configured to control said each light emitting unit of the light emitting units to be in one of the off state, the first lighting state, and the second lighting state so as to indicate progression of an operational phase of the aerosol-generating device to a user, and wherein the progression of the operational phase of the aerosol-generating device is progression of the usage session from a start to an end of the usage session.

2. The aerosol-generating device according to claim 1, wherein the at least one lighting array extends between a first end and second end of the at least one lighting array.

3. The aerosol-generating device according to claim 1, wherein the control electronics are further configured to independently control said each light emitting unit of the plurality of light emitting units in the at least one lighting array in a plurality of lighting states, and wherein in said each light emitting unit of the plurality of lighting states a respective light emitting unit emits light at a different static luminance level.

4. The aerosol-generating device according to claim 1, wherein the control electronics are further configured to control said each light emitting unit of the plurality of light emitting units to remain in the off state, the first lighting state, or the second lighting state for a predetermined amount of time, or until the progression of the operational phase of the aerosol-generating device is detected.

5. The aerosol-generating device according to claim 1, wherein the first static luminance level is more intense than the second static luminance level.

6. The aerosol-generating device according to claim 1, wherein the plurality of light emitting units are in the first lighting state during a first phase of progression though the operational phase of the aerosol-generating device.

7. The aerosol-generating device according to claim 1, wherein the control electronics are further configured to control said each light emitting unit of the plurality of light emitting units independently to be in the first lighting state initially, to be in the second lighting state after being in the first lighting state, and to be in the off state after being in the second lighting state while indicating the progression of the operational phase of the aerosol-generating device to the user.

8. The aerosol-generating device according to claim 1, wherein the control electronics are further configured to change a state of only one light emitting unit of the plurality of light emitting units in the at least one lighting array at any one time in response to detecting the progression of the operational phase of the aerosol-generating device.

9. The aerosol-generating device according to claim 8, wherein the control electronics are further configured to detect the progression of the operational phase of the aerosol-generating device by detecting one or more of: a user input, a puff on the device, generation of a predetermined amount of aerosol, or that a time has elapsed since a user input or a puff on the device.

10. The aerosol-generating device according to claim 1, wherein the plurality of light emitting units are in the off state during an n+5th phase of operation of the aerosol-generating device.

11. The aerosol-generating device according to claim 1, further comprising one or more waveguides configured to direct light generated by the plurality of light emitting units to one or more display windows in the at least one lighting array.

12. The aerosol-generating device according to claim 1, wherein said each light emitting unit of the plurality of light emitting units comprises a light emitting diode and the control electronics comprises a light emitting diode control driver and a separate microcontroller, the light emitting diode control driver being configured to control a supply of electricity from a power source to one or more light emitting units of the plurality of light emitting units under control of the microcontroller, so as to control said each light emitting unit of the light emitting units to be in one of the off state, or one of the lighting states.

13. The aerosol-generating device according to claim 12, wherein the light emitting diode control driver is further configured to control the supply of electricity from the power source to one or more light emitting units of the plurality of light emitting units by a pulse width modulation regime having a predetermined resolution, so as to control a luminance of the one or more light emitting units of the plurality of light emitting units in each one of the lighting states.

14. The aerosol-generating device according to claim 1, wherein the control electronics are further configured to independently control said each light emitting unit of the light emitting units in the off state, the first lighting state, and the second lighting state such that light emitted by the light emitting units in the first and the second lighting states is one or more of a usage session light emission, a low energy light emission, a thermal profile light emission, a pause light emission, a state change light emission, a progressing light emission, and a pre-heating light emission.

* * * * *